United States Patent
Saida

(10) Patent No.: US 9,553,759 B2
(45) Date of Patent: Jan. 24, 2017

(54) NETWORK SYSTEM, NODE DEVICE GROUP, AND SENSOR DEVICE GROUP

(75) Inventor: Takeshi Saida, Kyoto (JP)

(73) Assignee: OMRON Corporation, Kyoto (JP)

( * ) Notice: Subject to any disclaimer, the term of this patent is extended or adjusted under 35 U.S.C. 154(b) by 368 days.

(21) Appl. No.: 14/007,827

(22) PCT Filed: Feb. 15, 2012

(86) PCT No.: PCT/JP2012/053521
§ 371 (c)(1),
(2), (4) Date: Oct. 14, 2013

(87) PCT Pub. No.: WO2013/054549
PCT Pub. Date: Apr. 18, 2013

(65) Prior Publication Data
US 2014/0043961 A1    Feb. 13, 2014

(30) Foreign Application Priority Data

Oct. 13, 2011   (JP) ................................ 2011-225522

(51) Int. Cl.
*G01D 18/00*   (2006.01)
*H04L 12/28*   (2006.01)
(Continued)

(52) U.S. Cl.
CPC .......... *H04L 41/0654* (2013.01); *H04W 4/005* (2013.01); *H04W 76/027* (2013.01); *H04W 84/12* (2013.01); *H04W 84/18* (2013.01)

(58) Field of Classification Search
CPC ..... H04L 12/24; H04L 41/0654; H04W 84/12; H04W 76/027; H04W 84/18; H04W 4/005
(Continued)

(56) References Cited

U.S. PATENT DOCUMENTS

2005/0014486 A1* 1/2005 Shimizu et al. ............ 455/412.1
2006/0268795 A1* 11/2006 Tamaki ......................... 370/338
(Continued)

FOREIGN PATENT DOCUMENTS

| JP | 2003-85213 A | 3/2003 |
| JP | 2010-74829 A | 4/2010 |
| WO | 2010/126069 A1 | 11/2010 |

OTHER PUBLICATIONS

International Search Report for corresponding International Application No. PCT/JP2012/053521, mailed Mar. 13, 2012 (2 pages).

*Primary Examiner* — Edan Orgad
*Assistant Examiner* — Vanneilian Lalchinthang
(74) *Attorney, Agent, or Firm* — Osha Liang LLP

(57) ABSTRACT

A network system has a computer device, and a plurality of node devices communicatively connected to the computer device via network with one or more sensor devices allowed to be connected to each of the plurality of node devices via wireless communication. Each of the node devices obtains sensor data from the sensor device which is connected to the node device itself via the wireless communication and saves the sensor data in a sensor data storage section incorporated in the node device itself. The computer device specifies and requests via the network sensor data that any one or more of the one or more sensor devices obtained, and obtains via the network the specified sensor data from the node device which has saved the specified sensor data in the sensor data storage section among the plurality of node devices.

4 Claims, 16 Drawing Sheets

(51) Int. Cl.
  *H04B 7/00* (2006.01)
  *H04L 12/24* (2006.01)
  *H04W 84/12* (2009.01)
  *H04W 4/00* (2009.01)
  *H04W 76/02* (2009.01)
  *H04W 84/18* (2009.01)

(58) Field of Classification Search
  USPC .......................................................... 370/225
  See application file for complete search history.

(56) References Cited

U.S. PATENT DOCUMENTS

2007/0262863 A1* 11/2007 Aritsuka ................ H04B 17/27
                                                            340/539.22
2008/0191893 A1*  8/2008 Li et al. ...................... 340/686.6
2010/0065728 A1*  3/2010 Choi ..................... H04W 84/18
                                                            250/252.1

* cited by examiner

NETWORK SYSTEM, NODE DEVICE GROUP, AND SENSOR DEVICE GROUP

BACKGROUND

Technical Field

The present invention relates to a network system, and more particularly to a network system which includes a plurality of node devices and sensor devices which are connected to each of the node devices via wireless communication.

Also, the present invention relates to a node device group and a sensor device group included in the network system.

Related Art

Conventionally, as this type of network system, there has been known, for example, a system having a data processing server as a computer device and a first through a third sensor terminals as a plurality of node devices communicatively connected to each other via network with one or more sensor devices allowed to be connected to each of the sensor terminals via wireless communication as described in FIG. 36 of Patent Document 1 (Japanese Patent Laid-open Publication No. 2003-85213).

Patent Document 1: Japanese Patent Laid-open Publication No. 2003-85213

SUMMARY

In the above described network system, each sensor terminal, for example, obtains sensor data from the sensor device(s) which is connected to the sensor terminal itself via wireless communication and saves the sensor data in a sensor data storage section incorporated in the sensor terminal itself. The above described data processing server specifies and requests sensor data that any of the one or more sensor devices obtained and obtains the specified sensor data from the sensor terminal which has saved the specified sensor data in the sensor data storage section among the plurality of sensor terminals via network.

However, in the network system, each of the plurality of sensor terminals has an individual network identifier. As a result, when one of the sensor devices is to connect to any of the sensor terminals, it is required to previously perform a process of registering the network identifier of the sensor terminal to connect to in the sensor device, which is troublesome. Further, when one of the sensor devices is to connect to a specific one of the sensor terminals, it is required to search for the specific sensor terminal in an area in which the sensor device can connect to, which takes time.

One or more embodiments of the present invention provides a network system which includes a plurality of node devices and a sensor device which is connected to each of the node devices via wireless communication wherein the sensor device can connect to the node device in a short time by a simple process.

One or more embodiments of the present invention provides a node device group and a sensor device group included in the network system.

In a network system according to one or more embodiments of the present invention, at least a computer device and a plurality of node devices are communicatively connected to each other via network with one or more sensor devices allowed to be connected to each of the plurality of node devices via wireless communication, each of the node devices obtains sensor data from the sensor device(s) which is connected to the node device itself via the wireless communication and saves the sensor data in a sensor data storage section incorporated in the node device itself, and the computer device specifies and requests via the network sensor data that any one or more of the one or more sensor devices obtained, and obtains via the network the specified sensor data from the node device which has saved the specified sensor data in the sensor data storage section among the plurality of node devices.

In the network system, each of the node devices has a previously defined common network identifier for the wireless communication, each of the sensor devices requests connection to the plurality of node devices by specifying the network identifier to perform the wireless communication, the network system further comprising a connection configuration list storage section which stores a connection configuration list, the connection configuration list showing a corresponding relationship between each of the node devices and each of the sensor devices to be connected, and wherein each of the node devices has a connection approval/disapproval determination section which determines approval or disapproval of connection to each of the sensor devices based on the connection configuration list in response to the connection request from each of the sensor devices.

In this specification, the term "computer device" widely refers to computers which can communicate via network no matter what they are called, such as a client device, a server device, or a host computer.

Also, the term "network" widely refers to networks such as a local area network (LAN), a wide area network (WAN), or the Internet whether they are wired or wireless.

A node device which cannot be connected with a sensor device may be connected to the network in addition to the plurality of node devices (each of which can be connected with one or more sensor devices via wireless communication).

Also, the term "sensor device" widely includes devices which have a sensing function whether they are included in a sensor node or not.

As for the "connection configuration list storage section", it is only required for the network system to have a "connection configuration list storage section" regardless of the spatial location of the section.

In the network system according to one or more embodiments of the present invention, each of the node devices has a previously defined common network identifier for the wireless communication. Each of the sensor devices requests connection to the plurality of node devices by specifying the network identifier to perform the wireless communication. The connection approval/disapproval determination section of each of the node devices determines approval or disapproval of connection to each of the sensor devices based on the connection configuration list in response to the connection request from each of the sensor devices. Therefore, the connection between each of the node devices and each of the sensor devices is established according to the corresponding relationship shown in the connection configuration list.

In that case, the sensor device only needs to specify the network identifier to connect to the node device without needing to search for a node device to which the sensor device can connect via wireless communication. Therefore, the sensor device can connect to the node device in a short time by a simple process. As a result, the power consumption required by the sensor device in the process of connecting to the node device can be reduced, therefore, for example, in the case where the sensor device is powered by a battery, the battery life of the sensor device can be extended. The sensor device can request connection to the plurality of node devices without determining the node device to connect to. Therefore, the sensor device can be voluntarily installed and easily managed.

When the connection has been established based on the connection configuration list, each of the node devices obtains sensor data from the sensor device(s) which is connected to the node device itself via the wireless communication and saves the sensor data in the sensor data storage section incorporated in the node device itself. The computer device specifies and requests via the network sensor data that any one or more of the one or more sensor devices obtained, and obtains via the network the specified sensor data from the node device which has saved the specified sensor data in the sensor data storage section among the plurality of node devices. For example, the computer device specifies sensor data that any one or more of the one or more sensor devices obtained and requests the sensor data from the respective plurality of node devices via the network. In reply to the request issued by the computer device, the node device which has saved the specified sensor data in the sensor data storage section among the plurality of node devices sends the specified sensor data to the computer device via the network. As a result, the computer device can obtain desired sensor data even though the computer device does not know which of the plurality of node devices saves the desired sensor data.

Further, in the case where a failure occurs in any of the plurality of node devices or in the case where a load to a specific node device is to be distributed, the node device to which the sensor device is connected can be changed as a result of changing the connection configuration list and the sensor device is not required to perform any particular process. Therefore, the configuration of the sensor device can be simplified.

In this specification, the term "failure" means a something wrong such as a breakdown of the node device, a bad contact, disconnection of the communication line to the node device, a dead battery, or that a radio wave does not reach the node device.

In the network system of one embodiment, each of the node devices has a positive list creating section which creates a positive list, the positive list explicitly listing sensor devices to be approved of connection to the node device itself among the one or more sensor devices based on the connection configuration list, and the connection approval/disapproval determination section of each of the node devices determines approval or disapproval for connection between the node device itself and each of the sensor devices based on the positive list.

In the network system of this embodiment, the positive list creating section creates the positive list which explicitly lists sensor devices to be approved of connection to the node device itself among the one or more sensor devices based on the connection configuration list. The connection approval/disapproval determination section determines approval or disapproval for connection between the node device itself and each of the sensor devices based on the positive list. Here, the positive list is a list of extraction of sensor devices to be approved of connection to the node device itself from the connection configuration list, and is simpler than the connection configuration list. Therefore, the connection approval/disapproval determination section of each of the node devices can determine approval or disapproval for the connection more promptly and reliably based on this simple list.

In the network system of one embodiment, each of the node devices has a negative list creating section which creates a negative list, the negative list explicitly listing sensor devices to be disapproved of connection to the node device itself among the one or more sensor devices based on the connection configuration list, and the connection approval/disapproval determination section of each of the node devices determines approval or disapproval for connection between the node device itself and each of the sensor devices based on the negative list.

In the network system of this embodiment, the negative list creating section creates the negative list which explicitly lists sensor devices to be disapproved of connection to the node device itself among the one or more sensor devices based on the connection configuration list. The connection approval/disapproval determination section determines approval or disapproval for connection between the node device itself and each of the sensor devices based on the negative list. Here, the negative list is a list of extraction of sensor devices to be disapproved of connection to the node device itself from the connection configuration list, and is simpler than the connection configuration list. Therefore, the connection approval/disapproval determination section of each of the node devices can determine approval or disapproval for the connection more promptly and reliably based on this simple list.

Further, for example, even in the case where a connection request is issued by a new sensor device which is not on the connection configuration list to one of the node devices, any of the node devices can respond to the request and connect with the new sensor device. Therefore, the new sensor device can be easily recognized and added to the connection configuration list.

The network system of one embodiment includes an input section for rewriting the connection configuration list, wherein when the connection configuration list is rewritten, the positive list creating section of each of the node devices updates the positive list based on the rewritten connection configuration list, and the connection approval/disapproval determination section of each of the node devices determines approval or disapproval for connection between the node device itself and each of the sensor devices based on the updated positive list.

In the network system of this embodiment, when a user rewrites the connection configuration list using the input section, the positive list creating section updates the positive list based on the rewritten connection configuration list. Then, the connection approval/disapproval determination section determines approval or disapproval for connection between the node device itself and each of the sensor devices based on the updated positive list. Therefore, the user can voluntarily change combinations of each of the node devices and the sensor devices which are connected to the node device.

The network system of one embodiment includes an input section for rewriting the connection configuration list, wherein when the connection configuration list is rewritten, the negative list creating section of each of the node devices updates the negative list based on the rewritten connection configuration list, and the connection approval/disapproval determination section of each of the node devices determines approval or disapproval for connection between the node device itself and each of the sensor devices based on the updated negative list.

In the network system of this embodiment, when a user rewrites the connection configuration list using the input section, the negative list creating section updates the negative list based on the rewritten connection configuration list. Then, the connection approval/disapproval determination section determines approval or disapproval for connection between the node device itself and each of the sensor devices based on the updated negative list. Therefore, the user can voluntarily change combinations of each of the node devices and the sensor devices which are connected to the node device.

In the network system of one embodiment, each of the node devices has a new sensor device detection section which detects a new sensor device among the sensor devices which the connection approval/disapproval determination section has approved for connection to the node device itself based on the negative list, the new sensor device being not on the connection configuration list, and a display section which provides a visual display for prompting an input for determining which of the plurality of node devices is to be connected with the new sensor device upon the new sensor device detection section detecting the new sensor device.

In the network system of this embodiment, the display section provides a visual display for prompting an input for determining which of the plurality of node devices is to be connected with the new sensor device upon the new sensor device detection section detecting the new sensor device. Therefore, when the new sensor device is detected, the network system can prompt the user to perform the input.

In the network system of one embodiment, each of the node devices includes a failure detection section which detects a failure of the node devices other than the node device itself; and a connection configuration list rewriting section which rewrites the connection configuration list upon the failure detection section detecting the failure so that the node device itself and the sensor devices which have been approved of connection to the other node devices are in the corresponding relationship to be connected.

In the network system of this embodiment, the connection configuration list rewriting section rewrites the connection configuration list upon the failure detection section detecting the failure so that the node device itself and the sensor devices which have been approved of connection to the other node devices are in the corresponding relationship to be connected. Therefore, even in the case where the failure is detected, the sensor devices which have been approved of connection to the other node devices can be automatically switched from the other node devices to the node device itself by the connection configuration list rewriting section and connected to the node device itself. As a result, fault-tolerance (being tolerant to failure, i.e., capability of minimizing damage caused by the failure) can be realized.

In the network system of one embodiment, the connection configuration list storage section is provided for each of the plurality of node devices and contents of the connection configuration list storage sections are synchronized with each other.

In the network system of this embodiment, the connection configuration list storage section is provided for each of the plurality of node devices and contents of the connection configuration list storage sections are synchronized with each other. Therefore, each of the node devices can promptly recognize the corresponding relationship between each of the node devices and each of the sensor devices to be connected by referring to the contents of the connection configuration list storage section provided for the node device itself.

In the network system of one embodiment, the network identifier is a service set identifier for identifying a wireless LAN.

In the network system of this embodiment, the network identifier is a service set identifier for identifying a wireless LAN. Therefore, the sensor device can request connection to the plurality of node devices via the wireless LAN.

A node device group according to one or more embodiments of the present invention include a plurality of node devices in a network system, wherein at least a computer device and the plurality of node devices are communicatively connected to each other via network with one or more sensor devices allowed to be connected to each of the plurality of node devices via wireless communication, each of the node devices obtains sensor data from the sensor device(s) which is connected to the node device itself via the wireless communication and saves the sensor data in a sensor data storage section incorporated in the node device itself, and the computer device specifies and requests via the network sensor data that any one or more of the one or more sensor devices obtained, and obtains via the network the specified sensor data from the node device which has saved the specified sensor data in the sensor data storage section among the plurality of node devices.

In the node device group, each of the node devices has a previously defined common network identifier for the wireless communication, each of the sensor devices requests connection to the plurality of node devices by specifying the network identifier to perform the wireless communication, the network system further comprising a connection configuration list storage section which stores a connection configuration list, the connection configuration list showing a corresponding relationship between each of the node devices and each of the sensor devices to be connected, and wherein each of the node devices has a connection approval/disapproval determination section which determines approval or disapproval of connection to each of the sensor devices based on the connection configuration list in response to the connection request from each of the sensor devices.

In the node device group according to one or more embodiments of the present invention, each of the node devices has the previously defined common network identifier for the wireless communication. Each of the sensor devices requests connection to the plurality of node devices by specifying the network identifier to perform the wireless communication. The connection approval/disapproval determination section of each of the node devices determines approval or disapproval of connection to each of the sensor devices based on the connection configuration list in response to the connection request from each of the sensor devices. Therefore, the connection between each of the node devices and each of the sensor devices is established according to the corresponding relationship shown in the connection configuration list.

In that case, the sensor device only needs to specify the network identifier to connect to the node device without needing to search for a node device to which the sensor device can connect via wireless communication. Therefore, the sensor device can connect to the node device in a short time by a simple process. As a result, the power consumption required by the sensor device in the process of connecting to the node device can be reduced, therefore, for example, in the case where the sensor device is powered by a battery, the battery life of the sensor device can be extended. The sensor device can request connection to the plurality of node devices without determining the node device to connect to. Therefore, the sensor device can be voluntarily installed and easily managed.

When the connection has been established based on the connection configuration list, each of the node devices obtains sensor data from the sensor device(s) which is connected to the node device itself via the wireless communication and saves the sensor data in the sensor data storage section incorporated in the node device itself. The computer device specifies and requests via the network sensor data that any one or more of the one or more sensor devices obtained, and obtains via the network the specified sensor data from the node device which has saved the specified sensor data in the sensor data storage section among the plurality of node devices. For example, the computer device specifies sensor data that any one or more of the one or more sensor devices obtained and requests the sensor data from the respective plurality of node devices via the network. In reply to the request issued by the computer device, the node device which has saved the specified sensor data in the sensor data storage section among the plurality of node devices sends the specified sensor data to the computer device via the network. As a result, the computer device can obtain desired sensor data even though the computer device does not know which of the plurality of node devices saves the desired sensor data.

Further, in the case where a failure occurs in any of the plurality of node devices or in the case where a load to a specific node device is to be distributed, the node device to which the sensor device is connected can be changed as a result of changing the connection configuration list and the sensor device is not required to perform any particular process. Therefore, the configuration of the sensor device can be simplified.

In the node device group of one embodiment, each of the node devices has a positive list creating section which creates a positive list, the positive list explicitly listing sensor devices to be approved of connection to the node device itself among the one or more sensor devices based on the connection configuration list, and the connection approval/disapproval determination section of each of the node devices determines approval or disapproval for connection between the node device itself and each of the sensor devices based on the positive list.

In the node device group of this embodiment, the positive list creating section creates the positive list which explicitly lists sensor devices to be approved of connection to the node device itself among the one or more sensor devices based on the connection configuration list. The connection approval/ disapproval determination section determines approval or disapproval for connection between the node device itself and each of the sensor devices based on the positive list. Here, the positive list is a list of extraction of sensor devices to be approved of connection to the node device itself from the connection configuration list, and is simpler than the connection configuration list. Therefore, the connection approval/disapproval determination section of each of the node devices can determine approval or disapproval for the connection more promptly and reliably based on this simple list.

In the node device group of one embodiment, each of the node devices has a negative list creating section which creates a negative list, the negative list explicitly listing sensor devices to be disapproved of connection to the node device itself among the one or more sensor devices based on the connection configuration list, and the connection approval/disapproval determination section of each of the node devices determines approval or disapproval for connection between the node device itself and each of the sensor devices based on the negative list.

In the node device group of this embodiment, the negative list creating section creates the negative list which explicitly lists sensor devices to be disapproved of connection to the node device itself among the one or more sensor devices based on the connection configuration list. The connection approval/disapproval determination section determines approval or disapproval for connection between the node device itself and each of the sensor devices based on the negative list. Here, the negative list is a list of extraction of sensor devices to be disapproved of connection to the node device itself from the connection configuration list, and is simpler than the connection configuration list. Therefore, the connection approval/disapproval determination section of each of the node devices can determine approval or disapproval for the connection more promptly and reliably based on this simple list.

The node device group of one embodiment includes an input section for rewriting the connection configuration list, wherein when the connection configuration list is rewritten, the negative list creating section of each of the node devices updates the negative list based on the rewritten connection configuration list, and the connection approval/disapproval determination section of each of the node devices determines approval or disapproval for connection between the node device itself and each of the sensor devices based on the updated negative list.

Each of the node devices has a new sensor device detection section which detects a new sensor device among the sensor devices which the connection approval/disapproval determination section has approved for connection to the node device itself based on the negative list, the new sensor device being not on the connection configuration list, and a display section which provides a visual display for prompting an input for determining which of the plurality of node devices is to be connected with the new sensor device upon the new sensor device detection section detecting the new sensor device.

In the node device group of this embodiment, when a user rewrites the connection configuration list using the input section, the negative list creating section updates the negative list based on the rewritten connection configuration list. Then, the connection approval/disapproval determination section determines approval or disapproval for connection between the node device itself and each of the sensor devices based on the updated negative list. Therefore, the user can voluntarily change combinations of each of the node devices and the sensor devices which are connected to the node device. In the node device group of this embodiment, the display section provides a visual display for prompting an input for determining which of the plurality of node devices is to be connected with the new sensor device upon the new sensor device detection section detecting the new sensor device. Therefore, when the new sensor device is detected, the node device group can prompt the user to perform the input.

In the node device group of an embodiment, each of the node devices is characterized by having:

a failure detection section which detects a failure of the node devices other than the node device itself; and a connection configuration list rewriting section which rewrites the connection configuration list upon the failure detection section detecting the failure so that the node device itself and the sensor devices which have been approved of connection to the other node devices are in the corresponding relationship to be connected.

In the node device group of this embodiment, the connection configuration list rewriting section rewrites the connection configuration list upon the failure detection section detecting the failure so that the node device itself and the sensor devices which have been approved of connection to the other node devices are in the corresponding relationship to be connected. Therefore, even in the case where the failure is detected, the sensor devices which have been approved of connection to the other node devices can be automatically switched from the other node devices to the node device itself by the connection configuration list rewriting section and connected to the node device itself. As a result, fault-tolerance can be realized.

The sensor device group according to one or more embodiments of the present invention is a sensor device group including one or more sensor devices in a network system, and in the network system, at least a computer device and a plurality of node devices are communicatively connected to each other via network with the one or more sensor devices allowed to be connected to each of the plurality of node devices via wireless communication, each of the node devices obtains sensor data from the sensor device(s) which is connected to the node device itself via the wireless communication and saves the sensor data in a sensor data storage section incorporated in the node device itself, and the computer device specifies and requests via the network sensor data that any one or more of the one or more sensor devices obtained, and obtains via the network the specified sensor data from the node device which has saved the specified sensor data in the sensor data storage section among the plurality of node devices, each of the node devices has a previously defined common network identifier for the wireless communication, the network system further comprising a connection configuration list storage section which stores a connection configuration list, the connection configuration list showing a corresponding relationship between each of the node devices and each of the sensor devices to be connected, and wherein each of the node devices has a connection approval/disapproval determination section which determines approval or disapproval of connection to each of the sensor devices based on the connection configuration list in response to the connection request from each of the sensor devices, characterized in that each of the sensor devices requests connection to the plurality of node devices by specifying the network identifier to perform the wireless communication.

In the network system provided with the sensor device group according to one or more embodiments of the present invention, each of the node devices has a previously defined common network identifier for the wireless communication. Each of the sensor devices requests connection to the plurality of node devices by specifying the network identifier to perform the wireless communication. The connection approval/disapproval determination section of each of the node devices determines approval or disapproval of connection to each of the sensor devices based on the connection configuration list in response to the connection request from each of the sensor devices. Therefore, the connection between each of the node devices and each of the sensor devices is established according to the corresponding relationship shown in the connection configuration list.

In that case, the sensor device only needs to specify the network identifier to connect to the node device without needing to search for a node device to which the sensor device can connect via wireless communication. Therefore, the sensor device can connect to the node device in a short time by a simple process. As a result, the power consumption required by the sensor device in the process of connecting to the node device can be reduced, therefore, for example, in the case where the sensor device is powered by a battery, the battery life of the sensor device can be extended. The sensor device can request connection to the plurality of node devices without determining the node device to connect to. Therefore, the sensor device can be voluntarily installed and easily managed.

When the connection has been established based on the connection configuration list, each of the node devices obtains sensor data from the sensor device(s) which is connected to the node device itself via the wireless communication and saves the sensor data in the sensor data storage section incorporated in the node device itself. The computer device specifies and requests via the network sensor data that any one or more of the one or more sensor devices obtained, and obtains via the network the specified sensor data from the node device which has saved the specified sensor data in the sensor data storage section among the plurality of node devices. For example, the computer device specifies sensor data that any one or more of the one or more sensor devices obtained and requests the sensor data from the respective plurality of node devices via the network. In reply to the request issued by the computer device, the node device which has saved the specified sensor data in the sensor data storage section among the plurality of node devices sends the specified sensor data to the computer device via the network. As a result, the computer device can obtain desired sensor data even though the computer device does not know which of the plurality of node devices saves the desired sensor data.

Further, in the case where a failure occurs in any of the plurality of node devices or in the case where a load to a specific node device is to be distributed, the node device to which the sensor device is connected can be changed as a result of changing the connection configuration list and the sensor device is not required to perform any particular process. Therefore, the configuration of the sensor device can be simplified.

As is apparent from the above description, according to the network system, the node device group, and the sensor device group according to one or more embodiments of the present invention, it is possible to realize a network system which allows the sensor device to connect to the node device in a short time by a simple process.

DETAILED DESCRIPTION

Embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
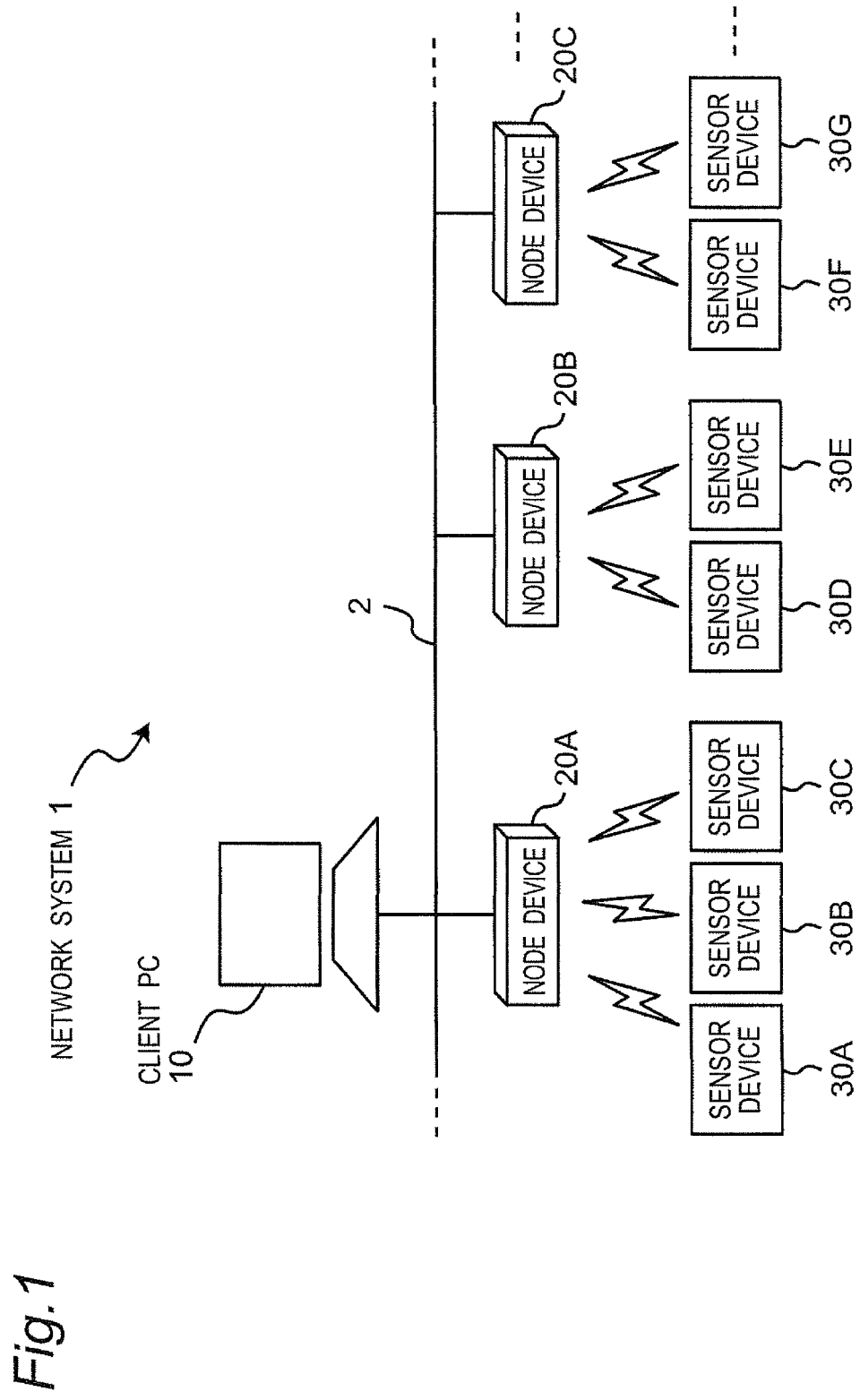
FIG. 1 is a diagram illustrating a schematic configuration of a network system according to one or more embodiments of the present invention.

FIG. 1 is a diagram illustrating a schematic configuration of a network system (generally denoted by the reference sign 1) according to one or more embodiments of the present invention.

The network system 1 includes a client PC (personal computer) 10 as a computer device and a plurality of node devices 20A, 20B, 20C, . . . as a node device group. The client PC 10 and the node devices 20A, 20B, 20C, . . . are communicatively connected to each other via a LAN (local area network) 2 as a network. One or more sensor devices 30A, 30B, 30C, 30D, 30E, 30F, 30G, . . . as a sensor device group are allowed to connect to each of the plurality of node devices 20A, 20B, 20C, . . . via wireless communication (in this example, Wi-Fi (registered trademark) as a wireless LAN).

Figure 2:
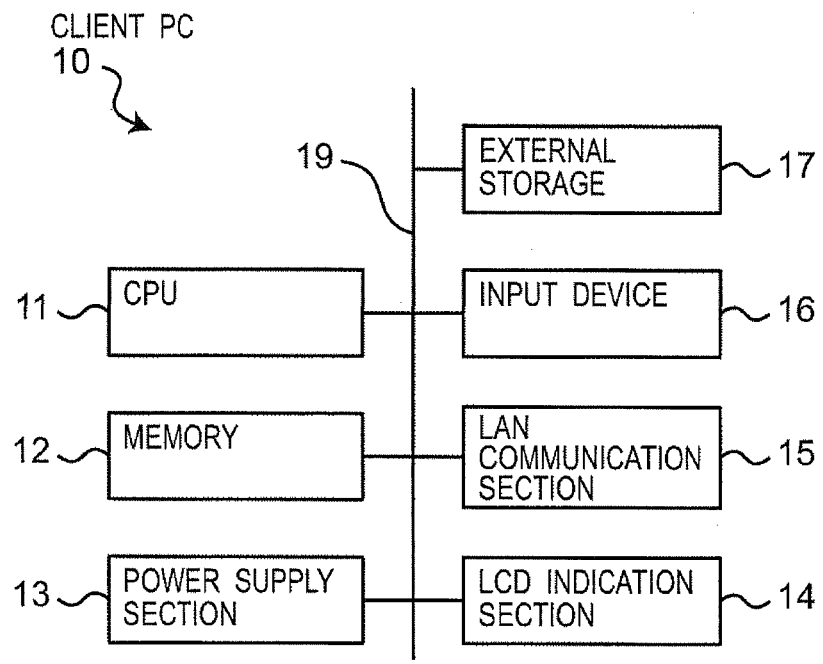
FIG. 2 is a diagram illustrating a block configuration of a client PC (personal computer) included in the network system.

As illustrated in a block configuration of FIG. 2, the client PC 10 includes a CPU (central processing unit) 11, a memory 12, a power supply section 13, an LCD (liquid crystal display element) display unit 14 as a display section, a LAN communication section 15, an input device 16 as an input section, and an external storage 17. These constituent elements 11, 12, 13, 14, 15, 16, and 17 are communicatively connected to each other via wiring 19. The CPU 11 controls the operation of the entire client PC 10. The memory 12 includes a DRAM (dynamic random access memory) and stores various types of data. The power supply section 13 supplies power to the respective constituent elements 11, 12, 13, 14, 15, 16, and 17 at a constant voltage (5V, 12V, or the like). The LCD display section 14 displays respective images according to the control by the CPU 11. The LAN communication section 15 functions to allow the client PC 10 to communicate with the node devices 20A, 20B, 20C, . . . , and other (not shown) computer devices, terminal devices, and the like via the LAN 2. The input device 16 includes a keyboard and a mouse and functions to allow a user to input various types of information and instructions to the client PC 10. The external storage 17 includes a hard disk drive, an optical disk, and the like, and stores an operating system (OS) and application software (program) for the client PC 10.

Figure 3:
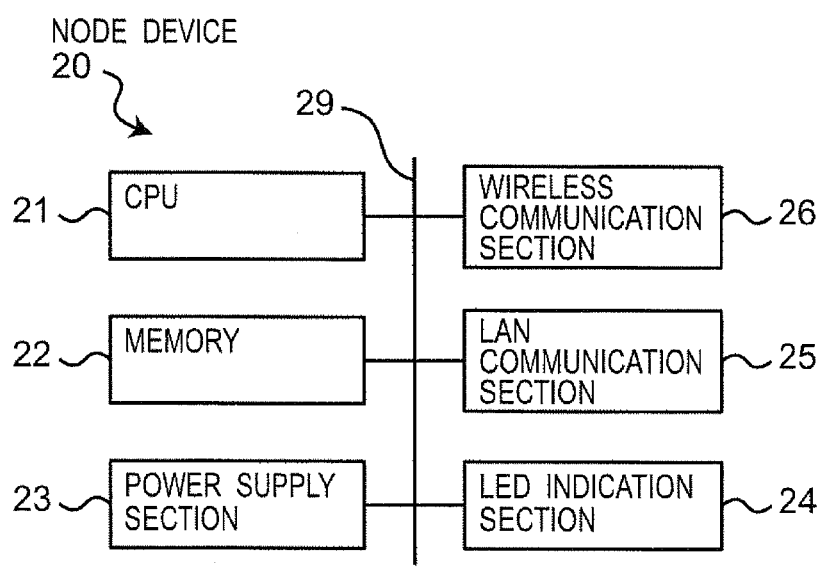
FIG. 3 is a diagram illustrating a block configuration of a node device included in the network system.

As illustrated in a block configuration of FIG. 3, each of the node devices 20 (denoted by a common reference sign 20 for representing the node devices 20A, 20B, 20C, . . . ) includes a CPU 21, a memory 22, a power supply section 23, an LED (light-emitting diode) indication section 24, a LAN communication section 25, and a wireless communication section 26. These constituent elements 21, 22, 23, 24, 25, and 26 are communicatively connected to each other via wiring 29. In this example, the CPU 21 operates at a clock frequency of 1.1 GHz and controls the operation of the entire node device 20. In this example, the memory 22 includes a flash memory and a DRAM (storage capacity of 512 MB) and stores an OS (in this example, Linux), a program, and various types of data for the node device 20. The power supply section 23 supplies power to the respective constituent elements 21, 22, 23, 24, 25, and 26 at a constant voltage (in this example, 5V). While power is supplied by the power supply section 23, the LED indication section 24 lights the LEDs (not shown) to indicate that the node device 20 is operating. The LAN communication section 25 functions to allow the node device 20 to communicate with the client PC 10 and the other node devices, and other (not shown) computer devices, terminal devices, and the like via the LAN 2. The wireless communication section 26 functions to allow the node device 20 to communicate with the sensor devices 30A, 30B, 30C, . . . via a wireless LAN. In this example, up to 64 sensor devices are allowed to connect to a node device 20 via the wireless LAN.

Figure 5:
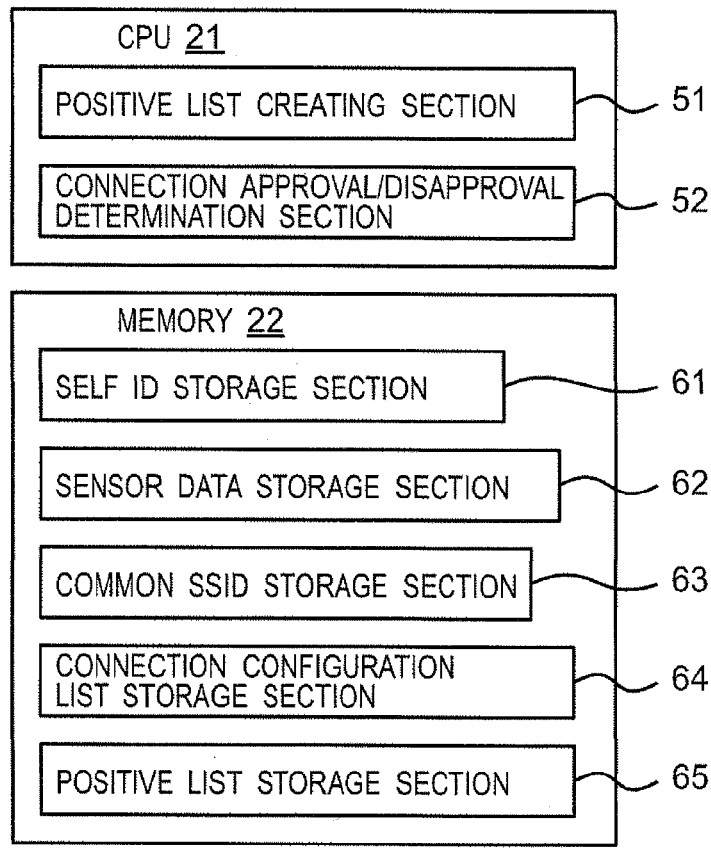
FIG. 5 is a diagram illustrating constituent elements from the viewpoint of functionality of a CPU (central processing unit) and a memory included in the node device in a first configuration example of the network system.

As illustrated in FIG. 5, the memory 22 of each of the node devices 20 has a self ID storage section 61 which stores an identification number (ID) for identifying the node device 20 itself for the wireless LAN connection. The sensor data storage section 62 stores sensor data from the sensor device which is connected to the node device 20 itself via the wireless LAN.

Figure 4:
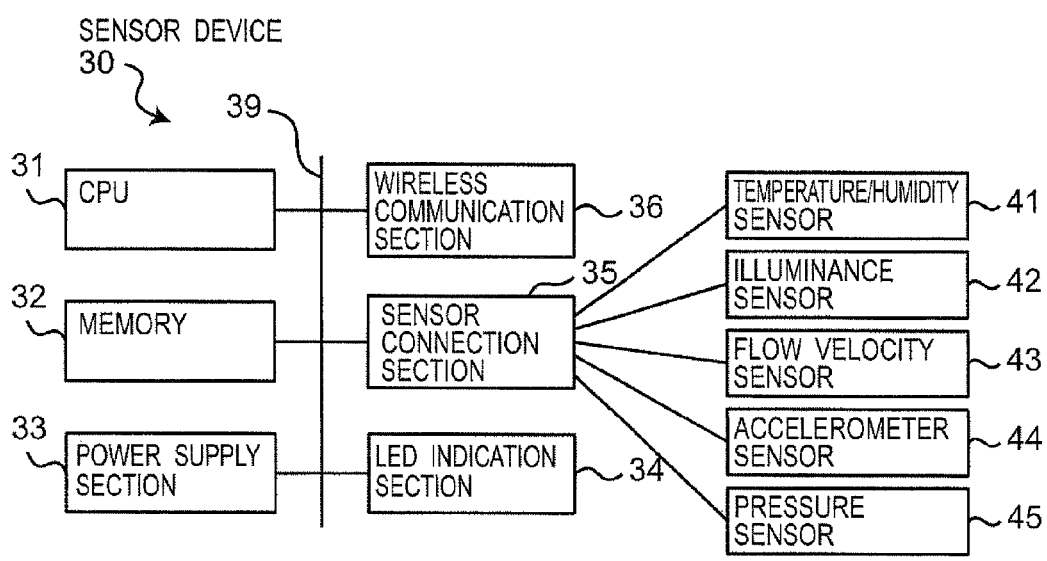
FIG. 4 is a diagram illustrating a block configuration of a sensor device included in the network system.

As illustrated in a block configuration of FIG. 4, each of the sensor devices 30 (denoted by a common reference sign 30 for representing the sensor devices 30A, 30B, 30C, . . . ) includes a CPU 31, a memory 32, a power supply section 33, an LED indication section 34, a sensor connection section 35, and a wireless communication section 36. These constituent elements 31, 32, 33, 34, 35, and 36 are communicatively connected to each other via wiring 39. According to the purpose of the sensor device 30, one or any number of, or all of a temperature/humidity sensor 41, an illuminance sensor 42, a flow velocity sensor 43, an accelerometer 44, and a pressure sensor 45 are connected to the sensor connection section 35. Here, these sensors 41, 42, 43, and 44 may be incorporated in the casing of the sensor device 30 or attached to the outside of the casing of the sensor device 30. The CPU 31 controls the operation of the entire sensor device 30. In this example, the memory 32 includes a flash memory and a DRAM and stores a program and various types of data for the sensor device 30. The power supply section 33 supplies power to the respective constituent elements 31, 32, 34, 35, and 36 and the sensors 41, 42, 43, 44, and 45 at a constant voltage (in this example, 3V). The LED indication section 34 includes a plurality of LEDs (not shown) and lights or flashes the respective LEDs according to the control by the CPU 31. As a result, the LED indication section 34 indicates the respective states such as whether the power supply of the sensor device 30 is switched on or not and whether the sensor device 30 is performing the wireless communication with any of the node devices 20A, 20B, 20C, . . . . The sensor connection section 35 functions to capture sensor data from any of the temperature/humidity sensor 41, the illuminance sensor 42, the flow velocity sensor 43, the accelerometer 44, and the pressure sensor 45 which is connected to the sensor connection section 35 into the sensor device 30. As a result, the sensor device 30 autonomously obtains the sensor data without receiving any particular instruction from outside. The wireless communication section 36 functions to allow the sensor device 30 to communicate with any of the node devices 20A, 20B, 20C, . . . via a wireless LAN.

Figure 6:
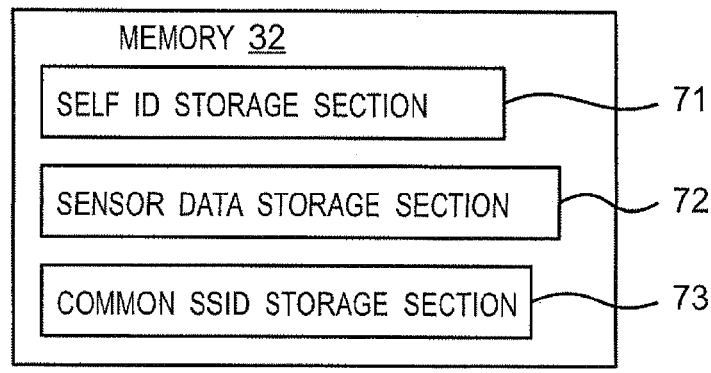
FIG. 6 is a diagram illustrating constituent elements from the viewpoint of functionality of a memory included in the sensor device in the first configuration example.

As illustrated in FIG. 6, the memory 32 of each of the sensor devices 30 has a self ID storage section 71 which stores an identification number (ID) for identifying the sensor device 30 for the wireless LAN connection. The sensor data storage section 72 stores sensor data which has been captured into the sensor device 30 itself.

In the example of FIG. 1, the three sensor devices 30A, 30B, and 30C are connected to the node device 20A via the wireless LAN but are not connected to the other node devices 20B, 20C, . . . . The two sensor devices 30D and 30E are connected to the node device 20B via the wireless LAN but are not connected to the other node devices 20A, 20C, . . . . The two sensor devices 30F and 30G, . . . are connected to the node device 20C via the wireless LAN but are not connected to the other node devices 20A, 20B, . . . .

According to the connection configuration, the node device 20A obtains sensor data from the sensor devices 30A, 30B, and 30C which are connected to the node device 20A itself via the wireless LAN and saves the sensor data in (the sensor data storage section 62 of) the memory 22 incorporated in the node device 20A itself. The node device 20B obtains sensor data from the sensor devices 30D and 30E which are connected to the node device 20B itself via the wireless LAN and saves the sensor data in the memory 22 incorporated in the node device 20B itself. Also, the node device 20C obtains sensor data from the sensor devices 30F and 30G which are connected to the node device 20C itself via the wireless LAN and saves the sensor data in the memory 22 incorporated in the node device 20C itself. Each of the node devices 20A, 20B, 20C, . . . never receives the sensor data from the sensor device which is not connected to itself.

The client PC 10 specifies and requests sensor data that any of the one or more sensor devices 30A, 30B, 30C, . . . obtained and obtains the specified sensor data from the node device which has saved the specified sensor data in the memory 22 among the plurality of node devices 20A, 20B, 20C, . . . via the LAN 2. In this example, the client PC 10 specifies sensor data that any of the sensor devices 30A, 30B, 30C, . . . obtained and requests the sensor data from the respective plurality of node devices 20A, 20B, 20C, . . . via the LAN 2. In reply to the request issued by the client PC 10, the node device which has saved the specified sensor data in the memory 22 among the plurality of node devices 20A, 20B, 20C, . . . sends the specified sensor data to the client PC 10 via the LAN 2. As a result, the client PC 10 can obtain the desired sensor data even though the client PC 10 does not know which of the plurality of node devices 20A, 20B, 20C, . . . saves the desired sensor data.

Meanwhile, in replying to the request issued by the client PC 10, the node device which has saved the specified sensor data in the memory 22 may process the specified sensor data according to the request by the client PC 10 before sending the specified sensor data to the PC 10.

As described above, in the conventional network system, each of the plurality of node devices has an individual network identifier. When one of the sensor devices is to connect to any of the node devices, the sensor device issues a connection request by specifying a specific network identifier among the previously set network identifiers of all the node devices. Therefore, the conventional network system requires such troublesome jobs as setting and managing of the network identifiers.

(First Configuration Example)

Then, in the first configuration example of the network system 1, from the viewpoint of functionality, the CPU 21 of each of the node devices 20 has a positive list creating section 51 and a connection approval/disapproval determination section 52 as illustrated in FIG. 5 (Each of the positive list creating section 51 and the connection approval/disapproval determination section 52 is implemented as a software program.). The memory 22 of each of the node devices 20 has a common SSID (service set identifier) storage section 63, a connection configuration list storage section 64, and a positive list storage section 65 in addition to the above described self ID storage section 61 and sensor data storage section 62.

Each of the node devices 20 has a previously defined common service set identifier (SSID) for identifying the wireless LAN. Then, the common SSID storage section 63 of each of the node devices 20 stores the SSID. The connection configuration list storage section 64 of each of the node devices 20 stores a connection configuration list 101 which shows a corresponding relationship between each of the node devices 20A, 20B, 20C, . . . and each of the sensor devices 30A, 30B, 30C, . . . to be connected. In this example, the connection configuration list 101 is initialized via network 2 by the user inputting through the input device 16 of the client PC 10. The connection configuration list storage sections 64 of the respective node devices 20 are synchronized with each other and update the corresponding relationship as required. The positive list storage section 65 of each of the node devices 20 stores a positive list (to be described later).

In each of the node devices 20, as soon as the power supply of the node device 20 is switched on and the node device 20 starts operating, the positive list creating section 51 creates a positive list which explicitly lists sensor devices to be approved of connection to the node device itself among the one or more sensor devices 30A, 30B, 30C, . . . by extracting a section indicating the sensor devices 30 to be approved of connection to the node device itself from the connection configuration list. The connection approval/disapproval determination section 52 of each of the node devices 20 determines approval or disapproval for connection between the node device itself and each of the sensor devices 30A, 30B, 30C, . . . based on the positive list.

Further, as illustrated in FIG. 6, a common SSID storage section 73 of each of the sensor devices 30 stores the SSID which is common to the respective node devices 20.

Now, a flow which starts with obtainment of sensor data by the sensor device 30A and ends with saving of the sensor data in the node device 20A will be described in detail with reference to FIGS. 7A to 7C (The reference signs of FIGS. 5 and 6 will be used as required).

Figure 7A:
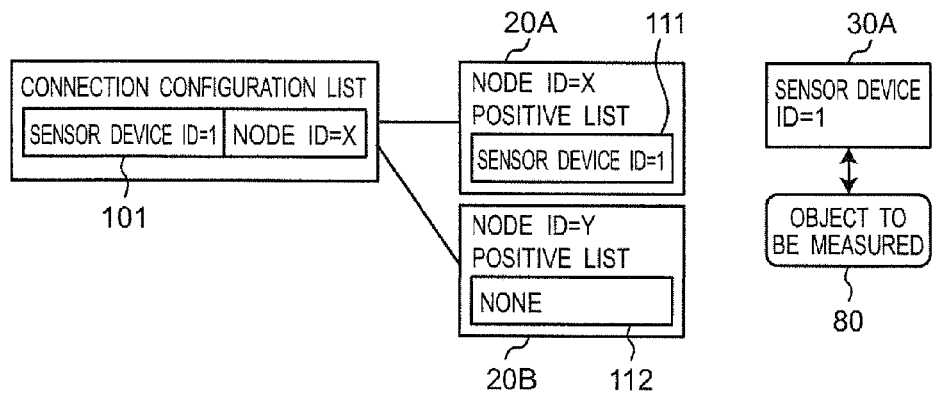
FIG. 7A is a diagram describing an operation of the sensor device for obtaining sensor data from an object to be measured in the first configuration example.

As illustrated in FIG. 7A, it is assumed that the ID of the node device 20A is X (NODE ID=X), the ID of the node device 20B is Y (NODE ID=Y), and the ID of the sensor device 30A is 1 (sensor device ID=1) (The same applies in FIGS. 7B, 7C, and 8A to 18C).

The node devices 20A and 20B store the synchronized connection configuration list 101 in the connection configuration list storage sections 64, respectively. The connection configuration list 101 describes that the sensor device ID=1 and NODE ID=X correspond to each other, i.e., that the sensor device 30A and the node device 20A are in a corresponding relationship.

Further, the node device 20A stores a positive list 111 which is created based on the connection configuration list 101 in the positive list storage section 65. The positive list 111 describes "sensor device ID=1", the ID of the sensor device 30A which is to be approved of connection to the node device 20A. On the other hand, the node device 20B has a positive list 112 which is created based on the connection configuration list 101. The positive list 112 describes "NONE" because there is no sensor device to be approved of connection to the node device 20B.

First, the sensor device 30A performs sensing on the object to be measured 80 and obtains the sensor data.

Figure 7B:
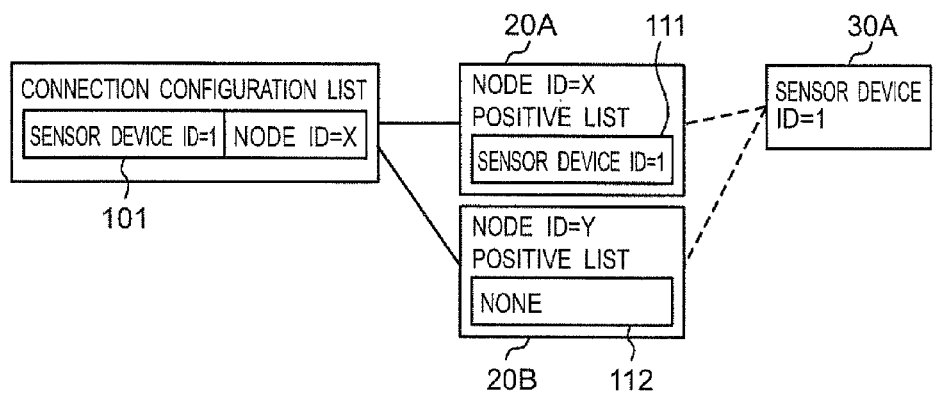
FIG. 7B is a diagram describing an operation of the sensor device for requesting the node device to connect in the first configuration example.

Next, as illustrated in FIG. 7B, the sensor device 30A requests connection to the node devices 20 by specifying the common SSID stored in the common SSID storage section 73 (The "request" is shown by dashed lines in the figure. The same applies hereinafter.) Therefore, the sensor device 30A can request connection to the node devices 20A and 20B via the wireless LAN.

Figure 7C:
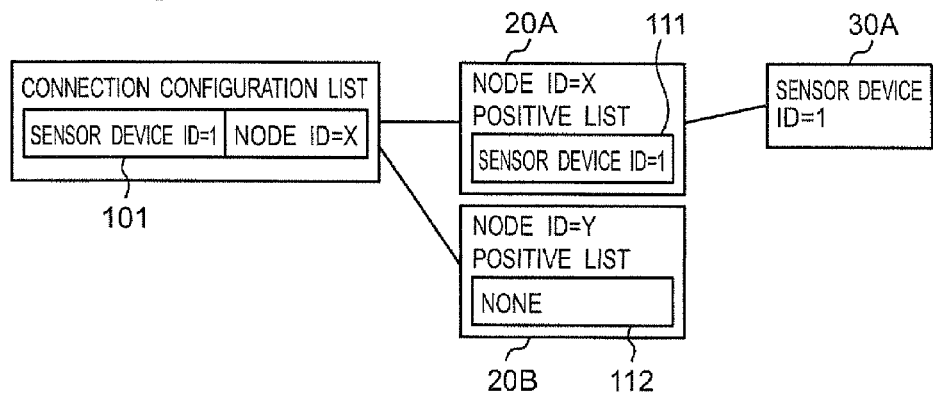
FIG. 7C is a diagram describing that connection between the sensor device and the node device has been established in the first configuration example.

Then, as illustrated in FIG. 7C, the connection approval/disapproval determination section 52 of the node device 20A approves the connection with the sensor device 30A based on the positive list 111. As a result, the node device 20A responds to the connection request from the sensor device 30A, and the connection between the node device 20A and the sensor device 30A is established. On the other hand, the connection approval/disapproval determination section 52 of the node device 20B does not approve connection with the sensor device 30A based on the positive list 112, therefore, the connection between the node device 20B and the sensor device 30A is not established. Here, the positive lists 111 and 112 are lists which are created as extraction of parts of the connection configuration list 101 (the parts indicating the sensor devices 30 to be approved of connection to the node devices themselves) and are simpler than the connection configuration list 101. Therefore, the connection approval/ disapproval determination section of each of the node devices 20 can determine approval or disapproval for the connection more promptly and reliably based on this simple list.

Subsequently, the sensor device 30A sends the sensor data to the node device 20A. The node device 20A receives the sensor data and saves it in the sensor data storage section 62. When the saving of the sensor data is completed, the node device 20A sends a reception completion notification to the sensor device 30A. When the sensor device 30A receives the reception completion notification, it discards the sensor data which has been sent to the node device 20A and cuts off the connection to the node device 20A.

Now, a flow which starts with new installment of a sensor device 30B and ends with establishment of connection between the node device 20B and the sensor device 30B will be described in detail with reference to FIGS. 8A to 8C (The reference signs of FIGS. 5 and 6 will be used as required).

Figure 8A:
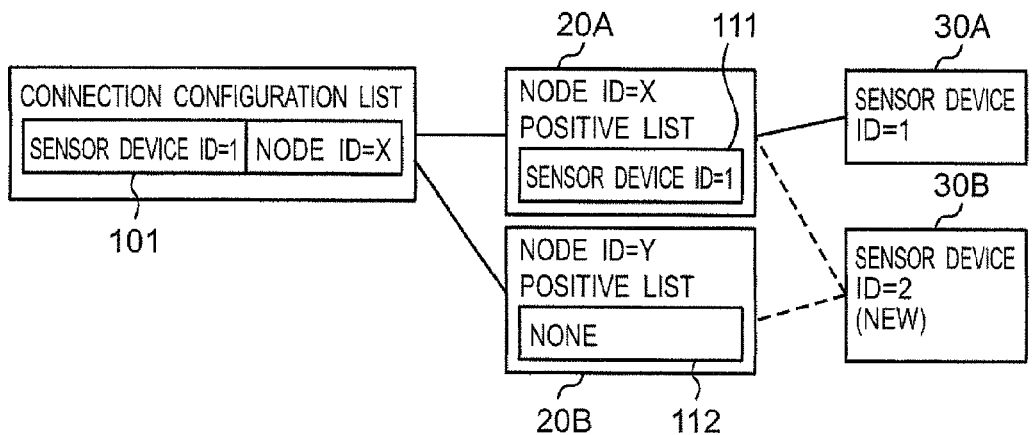
FIG. 8A is a diagram describing that a sensor device is newly installed in the first configuration example.

As illustrated in FIG. 8A, it is assumed that the ID of the newly installed sensor device 30B is 2 (sensor device ID=2) (The same applies in FIGS. 8B, 8C, 10A to 11C, and 16A to 18C).

The node devices 20A and 20B store the synchronized connection configuration list 101 in the connection configuration list storage sections 64, respectively. The connection configuration list 101 describes that the sensor device ID=1 and NODE ID=X correspond to each other.

Further, correspondingly to the connection configuration list 101, the positive list 111 of the node device 20A describes "sensor device ID=1", the ID of the sensor device 30A which is to be approved of connection to the node device 20A. On the other hand, the positive list 112 of the node device 20B describes "NONE" because there is no sensor device to be approved of connection to the node device 20B. As a result, the connection between the node device 20A and the sensor device 30A is established while the node device 20B is not connected with any of the sensor devices.

Here, the newly installed sensor device 30B requests connections to the node devices 20A and 20B via the wireless LAN by specifying the common SSID stored in the common SSID storage section 73. However, since the positive lists 111 and 112 do not describe "sensor device ID=2", the connections between the node devices 20A and 20B and the sensor device 30B are not established.

Figure 8B:
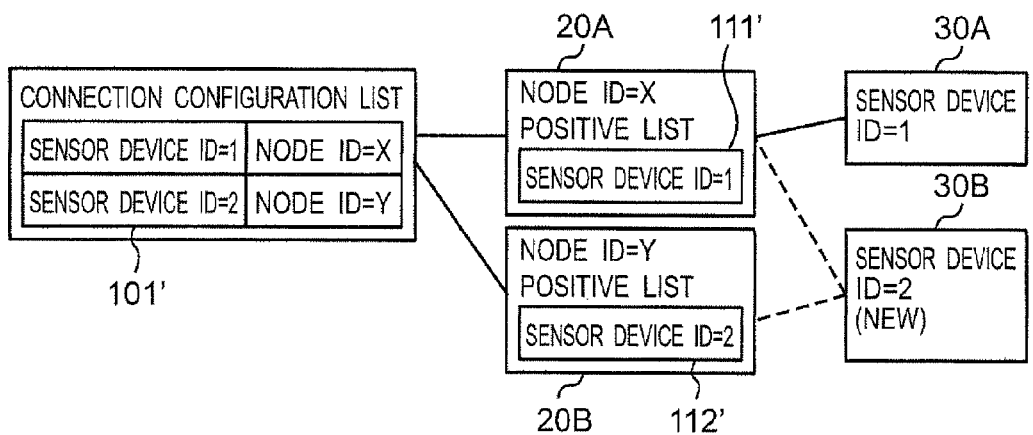
FIG. 8B is a diagram describing that a connection configuration list has been updated to correspond to the newly installed sensor device in the first configuration example.

Next, as illustrated in FIG. 8B, a system administrator, for example, rewrites the connection configuration list 101 to a connection configuration list 101' through the input device (not shown). As a result, the connection configuration list 101' describes that the sensor device ID=1 and NODE ID=X correspond to each other and that the sensor device ID=2 and NODE ID=Y correspond to each other. On this occasion, the positive list creating sections 51 and 51 of the node devices 20A and 20B create positive lists 111' and 112', respectively, based on the connection configuration list 101'. Here, the positive list 111' describes "sensor device ID=1" as the positive list 111 does. On the other hand, the positive list 112' describes "sensor device ID=2".

Figure 8C:
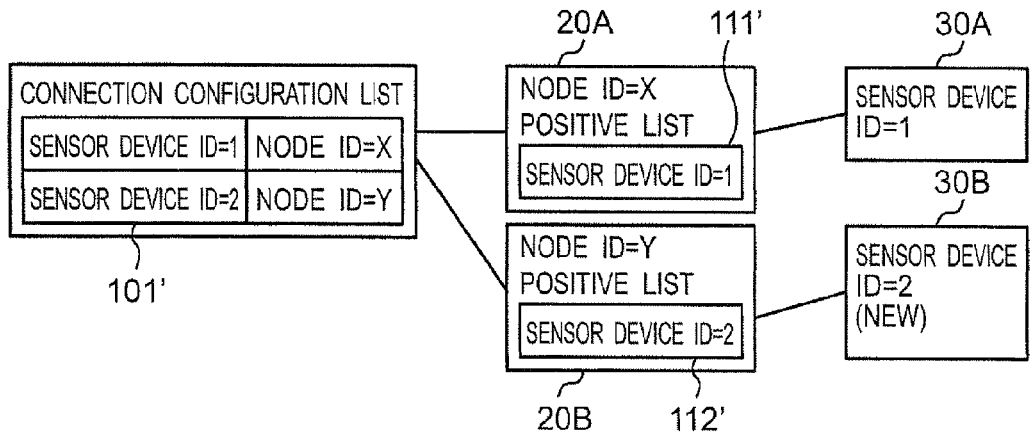
FIG. 8C is a diagram describing that connection between the newly installed sensor device and the node device has been established based on the updated connection list in the first configuration example.

Then, as illustrated in FIG. 8C, the connection approval/disapproval determination section 52 of the node device 20A approves the connection with the sensor device 30A based on the positive list 111'. As a result, the node device 20A responds to the connection request from the sensor device 30A, and the connection between the node device 20A and the sensor device 30A is established. On the other hand, the connection approval/disapproval determination section 52 of the node device 20B approves the connection with the sensor device 30B based on the positive list 112'. As a result, the node device 20B responds to the connection request from the sensor device 30B, and the connection between the node device 20B and the sensor device 30B is established.

Figure 9:
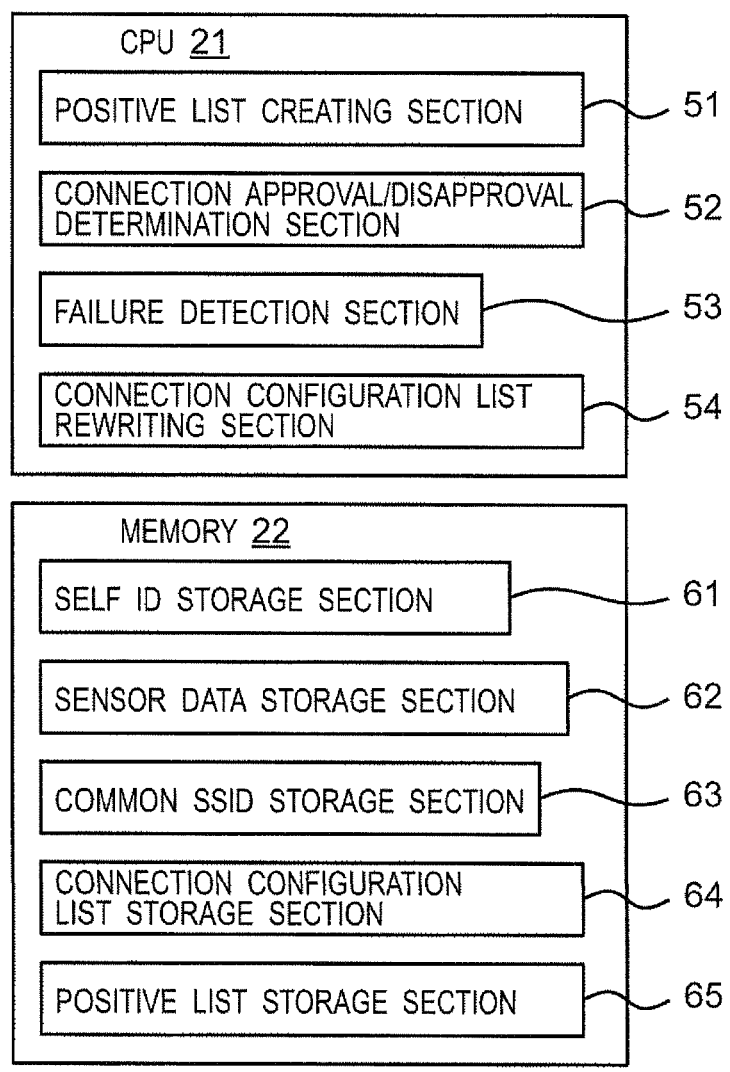
FIG. 9 is a diagram illustrating constituent elements from the viewpoint of functionality of the CPU and the memory with respect to a modification of the node device in the first configuration example correspondingly to FIG. 5.

FIG. 9 is a diagram illustrating constituent elements from the viewpoint of functionality of the CPU and the memory with respect to a modification of the node devices 20 in the first configuration example correspondingly to FIG. 5. In this modification, as illustrated in FIG. 9, the CPU 21 of each of the node devices 20 has a failure detection section 53 and a connection configuration list rewriting section 54 in addition to the positive list creating section 51 and the connection approval/disapproval determination section 52 illustrated in FIG. 5 (Each of the failure detection section 53 and the connection configuration list rewriting section 54 is implemented as a software program.). The failure detection section 53 of each of the node devices 20 detects a failure of the node devices other than the node device itself. The connection configuration list rewriting section 54 of each of the node devices 20 rewrites the connection configuration list upon the failure detection section 53 detecting the failure so that the node device itself and the sensor devices which have been approved of connection to the other node devices are in the corresponding relationship to be connected.

Now, a flow in which, in response to an occurrence of a failure of the node device 20B, the failure detection section 53 and the connection configuration list rewriting section 54 are caused to function, and as a result, the connection destination of the sensor device 30B is changed and connection between the node device 20A and the sensor device 30B is established will be described in detail with reference to FIGS. 10A to 10C (The reference signs of FIGS. 6 and 9 will be used as required).

Figure 10A:
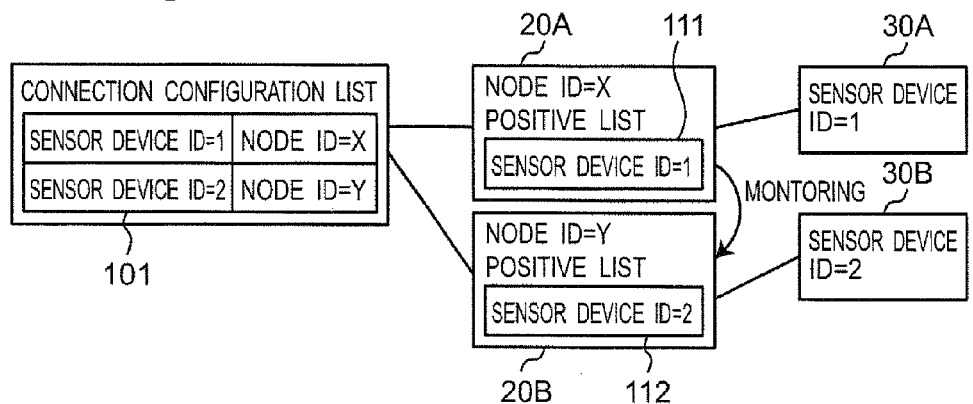
FIG. 10A is a diagram describing that the node device configured as illustrated in FIG. 9 is monitoring another node device for failure.

As illustrated in FIG. 10A, the node devices 20A and 20B store the synchronized connection configuration list 101 in the connection configuration list storage sections 64, respectively. The connection configuration list 101 describes that the sensor device ID=1 and NODE ID=X correspond to each other and that the sensor device ID=2 and NODE ID=Y correspond to each other.

Further, correspondingly to the connection configuration list 101, the positive list 111 of the node device 20A describes "sensor device ID=1". On the other hand, the positive list 112 of the node device 20B describes "sensor device ID=2". As a result, connection between the node device 20A and the sensor device 30A is established while connection between the node device 20B and the sensor device 30B is established.

The node device 20A is monitoring the node device 20B for failure by the failure detection section 53 which detects a failure of the node device 20B.

Figure 10B:
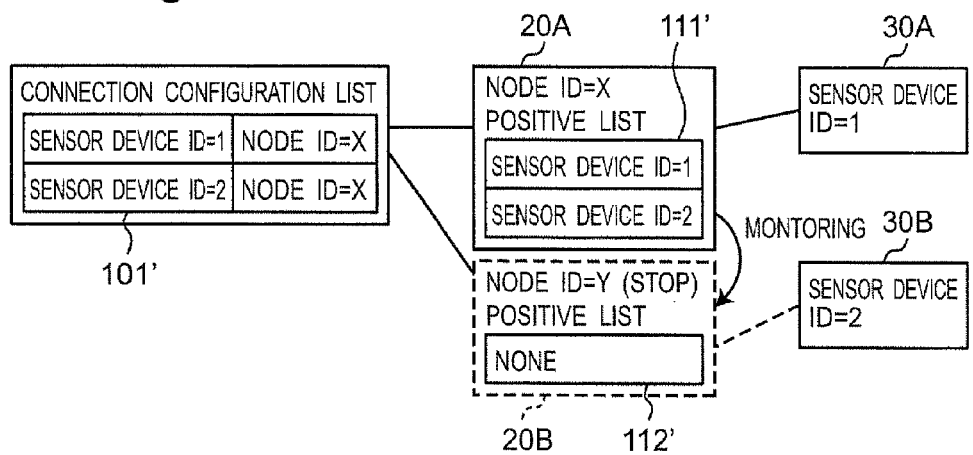
FIG. 10B is a diagram describing that a failure occurs in the other node device.

Then, as illustrated in FIG. 10B, for example, it is assumed that a failure occurs in the node device 20B and is detected by the failure detection section 53 of the node device 20A, and then, the connection configuration list rewriting section 54 of the node device 20A rewrites the connection configuration list 101 to a connection configuration list 101' so that the node device 20A and the sensor device 30B which has been approved of connection to the node device 20B are in the corresponding relationship to be connected. Specifically, the list describing that the sensor device ID=2 corresponds to NODE ID=Y is rewritten as the list describing that the sensor device ID=2 corresponds to NODE ID=X. On this occasion, the positive list creating sections 51 and 51 of the node devices 20A and 20B create positive lists 111' and 112', respectively, based on the connection configuration list 101'. Here, the positive list 111' describes "sensor device ID=1, sensor device ID=2". On the other hand, the positive list 112' describes "NONE".

Figure 10C:
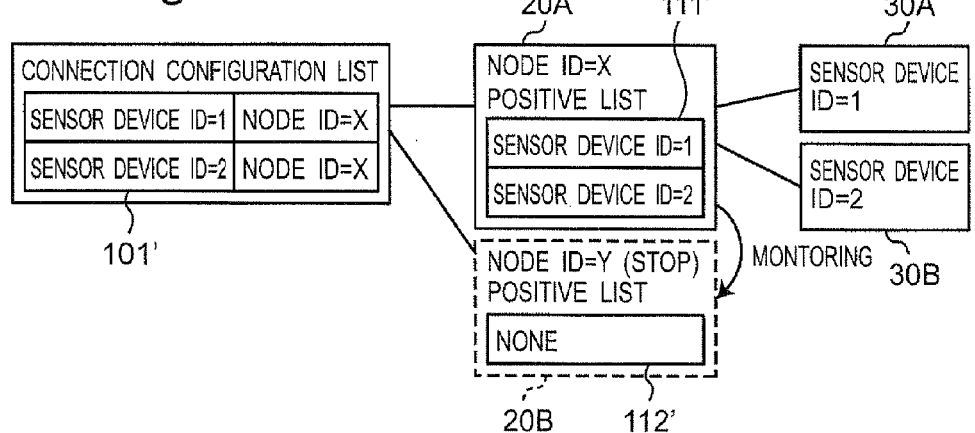
FIG. 10C is a diagram describing that connection between a sensor device which has been connected to the node device having a failure and the node device which has been monitoring for failure has been established.

Then, as illustrated in FIG. 10C, the connection approval/disapproval determination section 52 of the node device 20A approves the connections with the sensor devices 30A and 30B based on the updated positive list 111'. As a result, the node device 20A responds to the connection requests from the sensor devices 30A and 30B, and the connections between the node device 20A and the sensor devices 30A and 30B are established.

As described above, even in the case where the failure is detected, the sensor device 30B which has been approved of connection to the node device 20B can be automatically switched from the node device 20B to the node device 20A by the connection configuration list rewriting section 54 and connected to the node device 20A. That is, in the case where a failure occurs in any of the plurality of node devices 20, the connection configuration list rewriting section 54 rewrites the connection configuration list 101, so that the node device 20 to which the sensor device 30 is to connect can be changed. As a result, fault-tolerance (being tolerant to failure, i.e., capability of minimizing damage caused by the failure) can be realized. In addition, the sensor device 30 does not need to perform any particular processing in changing the node device 20 to connect to. Therefore, the configuration of the sensor device 30 can be simplified.

Here, instead of the connection configuration list rewriting section 54, the user may rewrite the connection configuration list 101 via the network 2 by an input through the input device 16 of the client PC 10. In that way, the user is allowed to change the node device 20, to which the sensor device 30 is to connect, with desired timing such as when a failure occurs in any of the node devices 20 or when the user wants to distribute a load to a specific node device 20.

Now, a flow in which the connection destination of the sensor device 30B is changed from the node device 20B to the node device 20A by an input operation by the user and connection between the sensor device 30B and the node device 20A is established will be described in detail with reference to FIGS. 11A to 11C (The reference signs of FIGS. 5 and 6 will be used as required).

Figure 11A:
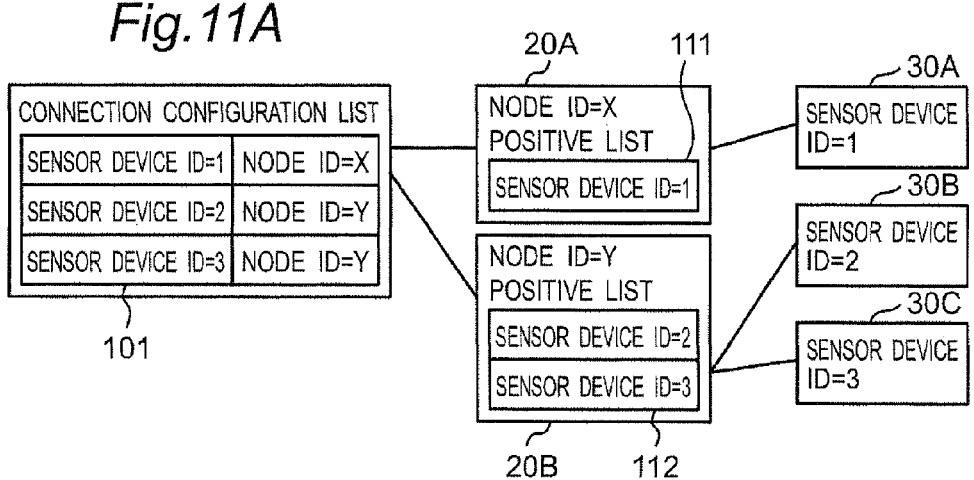
FIG. 11A is a diagram describing a state before the connection state between the node device and the sensor device is changed in the first configuration example.

As illustrated in FIG. 11A, it is assumed that the ID of the sensor device 30C is 3 (sensor device ID=3) (the same applies in FIGS. 11B, 11C, and 18A to 18C).

The node devices 20A and 20B store the synchronized connection configuration list 101 in the connection configuration list storage sections 64, respectively. The connection configuration list 101 describes that the sensor device ID=1 and NODE ID=X correspond to each other and that the sensor device ID=2 and NODE ID=Y correspond to each other, and further, that the sensor device ID=3 and NODE ID=Y correspond to each other.

Further, correspondingly to the connection configuration list 101, the positive list 111 of the node device 20A describes "sensor device ID=1" and the positive list 112 of the node device 20B describes "sensor device ID=2, sensor device ID=3". As a result, connection between the node device 20A and the sensor device 30A is established while connections between the node device 20B and the sensor devices 30B and 30C are established.

Figure 11B:
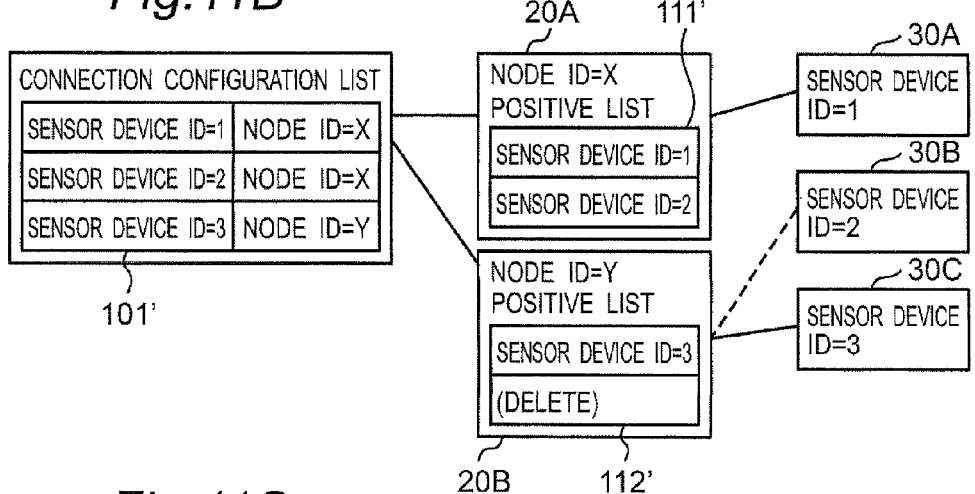
FIG. 11B is a diagram describing a process of changing the connection state between the node device and the sensor device in the first configuration example.

Then, as illustrated in FIG. 11B, the user, for example, rewrites the connection configuration list 101 to a connection configuration list 101' through the input device (not shown). As a result, the connection configuration list 101' describes that the sensor device ID=1 and NODE ID=X correspond to each other and that the sensor device ID=2 and NODE ID=X correspond to each other, and further, that the sensor device ID=3 and NODE ID=Y correspond to each other. On this occasion, the positive list creating sections 51 and 51 of the node devices 20A and 20B create positive lists 111' and 112', respectively, based on the connection configuration list 101'. Here, the positive list 111' describes "sensor device ID=1, sensor device ID=2". On the other hand, the positive list 112' describes "sensor device ID=3".

Figure 11C:
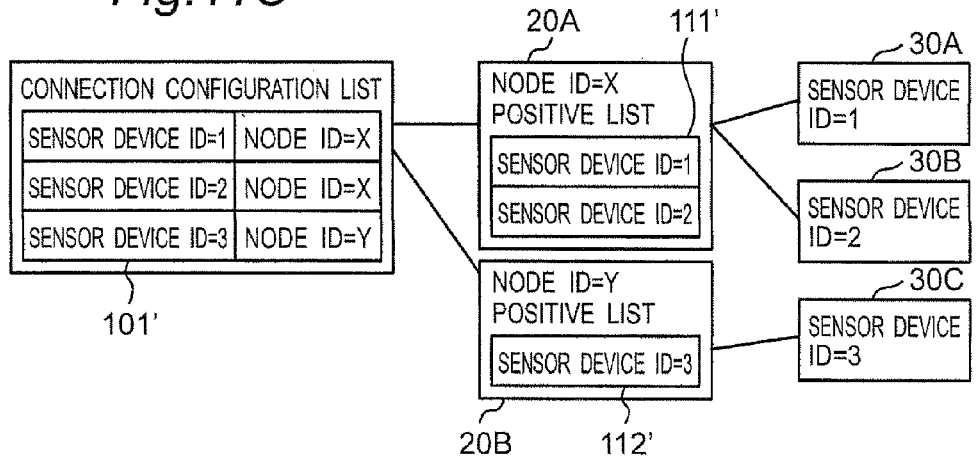
FIG. 11C is a diagram describing a state after the connection state between the node device and the sensor device has been changed in the first configuration example.

Then, as illustrated in FIG. 11C, the connection approval/disapproval determination section 52 of the node device 20A approves the connections with the sensor devices 30A and 30B based on the positive list 111'. As a result, the node device 20A responds to the connection requests from the sensor devices 30A and 30B, and the connections between the node device 20A and the sensor devices 30A and 30B are established. On the other hand, the connection approval/disapproval determination section 52 of the node device 20B approves the connection with the sensor device 30C based on the positive list 112'. As a result, the node device 20B responds to the connection request from the sensor device 30C, and the connection between the node device 20B and the sensor device 30C is established.

Therefore, the user can voluntarily change the combinations of each of the node devices 20 and the sensor devices 30 which are connected to the node device 20.

Further, the sensor device 30A only needs to specify the common SSID stored in the common SSID storage section 63 to connect to the node device 20A without needing to search for any of the node devices 20 to which the sensor device 30A can connect via wireless communication. Therefore, the sensor device 30A can connect to the node device 20A in a short time by a simple process. As a result, the power consumption required by the sensor device 30A in the process of connecting to the node device 20A can be reduced. For example, in the case where the sensor device 30A is powered by a battery, the life of the battery of the sensor device 30A can be extended. Further, the sensor device 30A can request connection to the plurality of node devices 20 without determining the node device 20 to connect to. Therefore, the sensor device 30A can be voluntarily installed and easily managed.

(Second Configuration Example)

Figure 12:
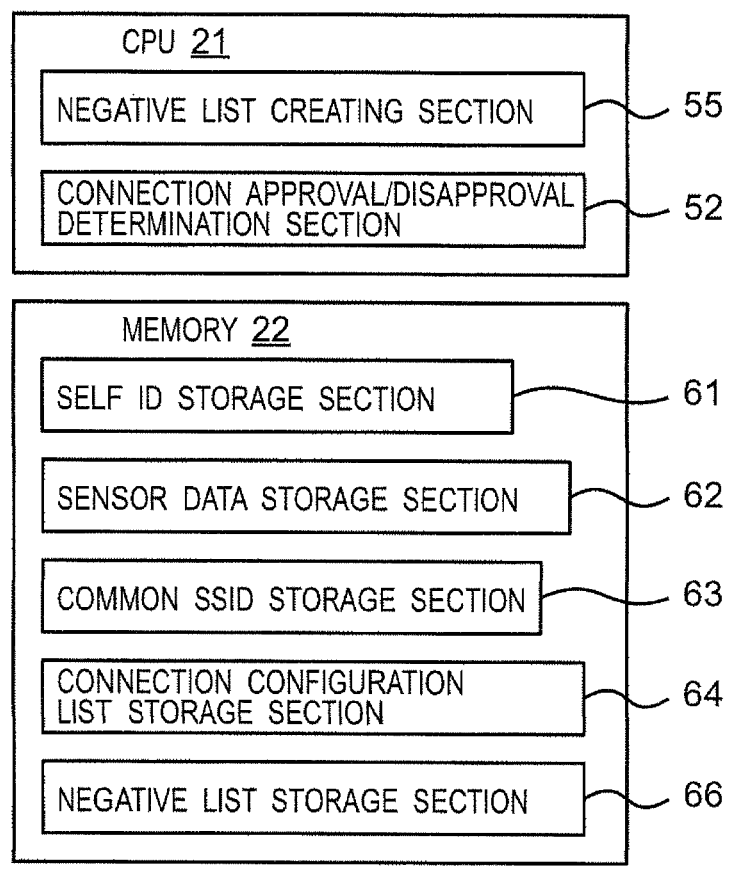
FIG. 12 is a diagram illustrating constituent elements from the viewpoint of functionality of a CPU (central processing unit) and a memory included in the node device in a second configuration example of the network system.

FIG. 12 is a diagram illustrating constituent elements from the viewpoint of functionality of the CPU 21 and the memory 22 included in the node device 20 in the second configuration example of the network system 1. In FIG. 12, the same constituent elements as those in FIG. 5 are denoted by the same reference numbers as those in FIG. 5 and their description will be omitted.

In the second configuration example, from the viewpoint of functionality, the CPU 21 of each of the node devices 20 has a negative list creating section 55 in addition to the connection approval/disapproval determination section 52 as illustrated in FIG. 12 (The negative list creating section 55 is implemented as a software program.). The memory 22 of each of the node devices 20 has a negative list storage section 66.

In each of the node devices 20, as soon as the power supply of the node device 20 is switched on and the node device 20 starts operating, the negative list creating section 55 creates a negative list which explicitly lists sensor devices to be disapproved of connection to the node device itself among the one or more sensor devices 30A, 30B, 30C, . . . by extracting a part indicating the sensor devices 30 to be connected to the node devices other than the node device 20 itself from the connection configuration list 101 which indicates the corresponding relationship between each of the node devices 20A, 20B, 20C, . . . and each of the sensor devices 30A, 30B, 30C, . . . are to be connected. Meanwhile, in this example, the connection configuration list 101 is initialized via the network 2 by the user inputting through the input device 16 of the client PC 10 as in the first configuration example.

The negative list storage section 66 of each of the node devices 20 stores the negative list.

Now, a flow which starts with obtainment of sensor data by the sensor device 30A and ends with saving of the sensor data in the node device 20A will be described in detail with reference to FIGS. 13A to 13C (The reference signs of FIGS. 12 and 6 will be used as required).

Figure 13A:
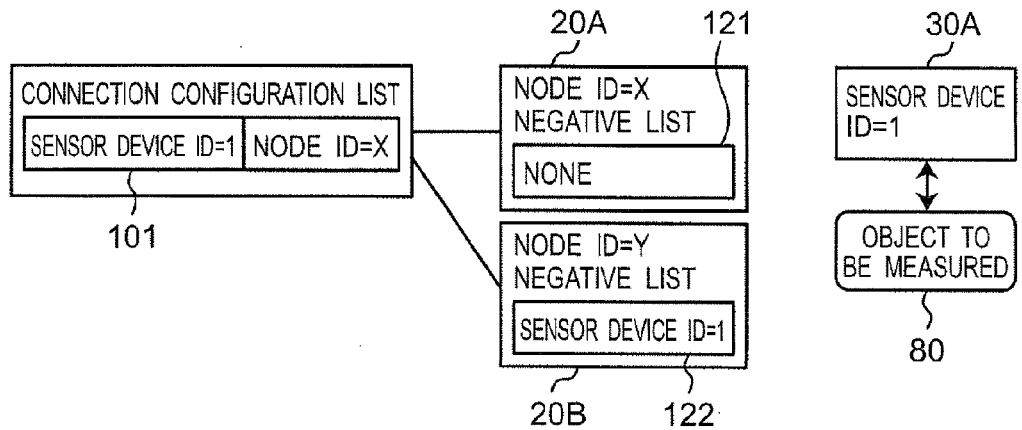
FIG. 13A is a diagram describing an operation of the sensor device for obtaining sensor data from an object to be measured in the second configuration example.

As illustrated in FIG. 13A, the node devices 20A and 20B store the synchronized connection configuration list 101 in the connection configuration list storage sections 64, respectively. The connection configuration list 101 describes that the sensor device ID=1 and NODE ID=X correspond to each other.

Further, the node device 20A stores a negative list 121 which is created based on the connection configuration list 101 in the negative list storage section 66. The negative list 121 describes "NONE" because there is no sensor device to be disapproved of connection to the node device 20A. On the other hand, the node device 20B stores a negative list 122 which is created based on the connection configuration list 101 in the negative list storage section 66. The negative list 122 describes "sensor device ID=1", the ID of the sensor device 30A which is to be disapproved of connection to the node device 20B.

First, the sensor device 30A performs sensing on the object to be measured 80 and obtains the sensor data.

Figure 13B:
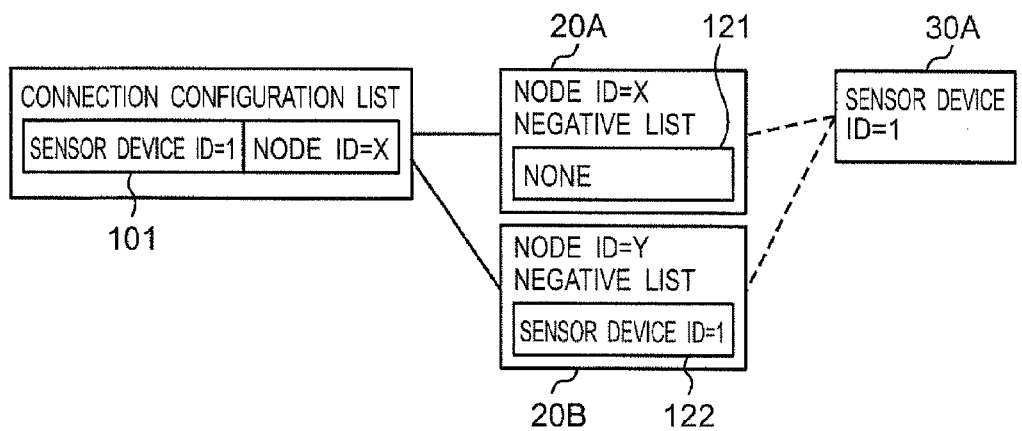
FIG. 13B is a diagram describing an operation of the sensor device for requesting the node device to connect in the second configuration example.

Next, as illustrated in FIG. 13B, the sensor device 30A requests connections to the node devices 20A and 20B via the wireless LAN by specifying the common SSID stored in the common SSID storage section 73.

Figure 13C:
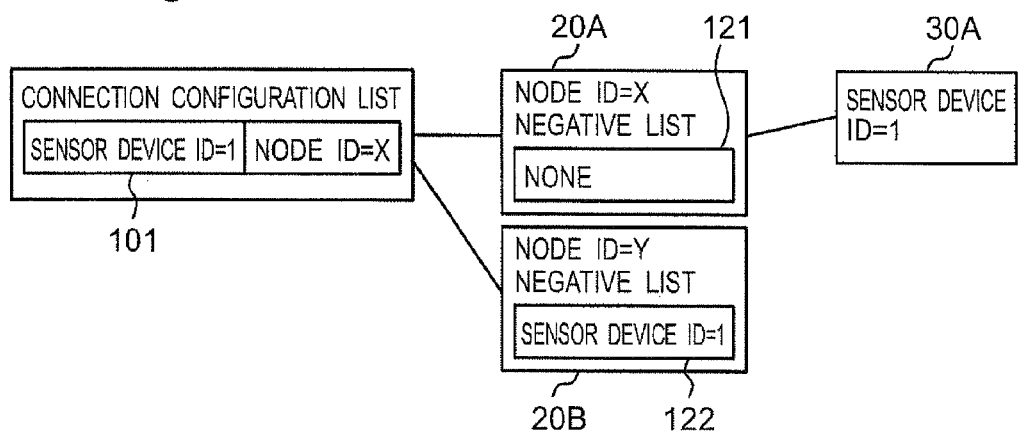
FIG. 13C is a diagram describing that connection between the sensor device and the node device has been established in the second configuration example.

Then, as illustrated in FIG. 13C, the connection approval/disapproval determination section 52 of the node device 20A approves the connection with the sensor device 30A based on the negative list 121. As a result, the node device 20A responds to the connection request from the sensor device 30A, and the connection between the node device 20A and the sensor device 30A is established. On the other hand, the connection approval/disapproval determination section 52 of the node device 20B does not approve the connection with the sensor device 30A based on the negative list 122, therefore, the connection between the node device 20B and the sensor device 30A is not established. Here, the negative lists 121 and 122 are lists which are created as extraction of a part of the connection configuration list 101 (the part indicating the sensor device 30 to be connected to the node devices other than the node device 20 itself) and are simpler than the connection configuration list 101. Therefore, the connection approval/disapproval determination section of each of the node devices 20 can determine approval or disapproval for the connection more promptly and reliably based on this simple list.

Subsequently, the sensor device 30A sends the sensor data to the node device 20A. The node device 20A receives the sensor data and saves it in the sensor data storage section 62. When the saving of the sensor data is completed, the node device 20A sends a reception completion notification to the sensor device 30A. When the sensor device 30A receives the reception completion notification, it discards the sensor data which has been sent to the node device 20A and cuts off the connection to the node device 20A.

Figure 14:
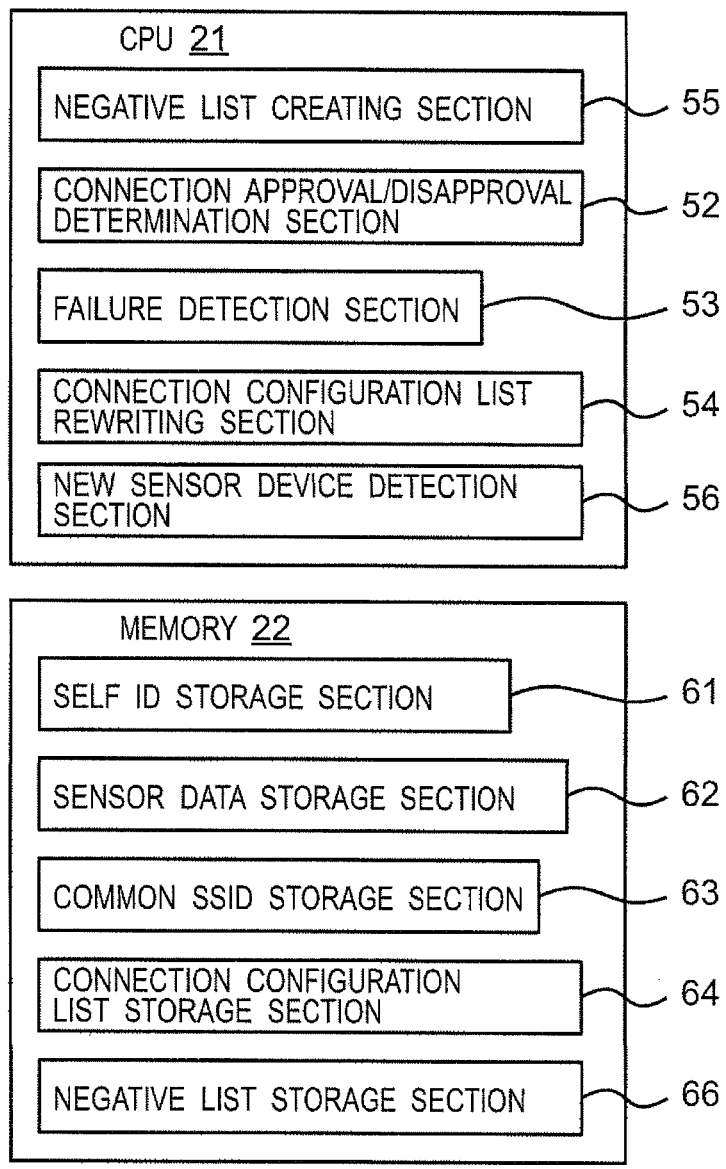
FIG. 14 is a diagram illustrating constituent elements from the viewpoint of functionality of the CPU and the memory with respect to a modification of the node device in the second configuration example correspondingly to FIG. 12.

FIG. 14 is a diagram illustrating constituent elements from the viewpoint of functionality of the CPU and the memory with respect to a modification of the node devices 20 in the second configuration example correspondingly to FIG. 12. In this modification, as illustrated in FIG. 14, the CPU 21 of each of the node devices 20 has a new sensor device detection section 56 in addition to the negative list creating section 55 and the connection approval/disapproval determination section 52 illustrated in FIG. 12 (The new sensor device detection section 56 is implemented as a software program.). Meanwhile, the failure detection section 53 and the connection configuration list rewriting section 54 are the same as those illustrated in FIG. 9.

The new sensor device detection section 56 detects a sensor device which is newly connected to the plurality of node devices 20A, 20B, 20C, . . . via the wireless connection.

Now, a flow which starts with new installment of the sensor device 30A and ends with establishment of connection between the node device 20A and the sensor device 30A as a result of causing the new sensor device detection section 56 to function in an initial state of the connection configuration list 101 which has not described anything yet will be described in detail with reference to FIGS. 15A to 15C (The reference signs of FIGS. 14 and 6 will be used as required).

Figure 15A:
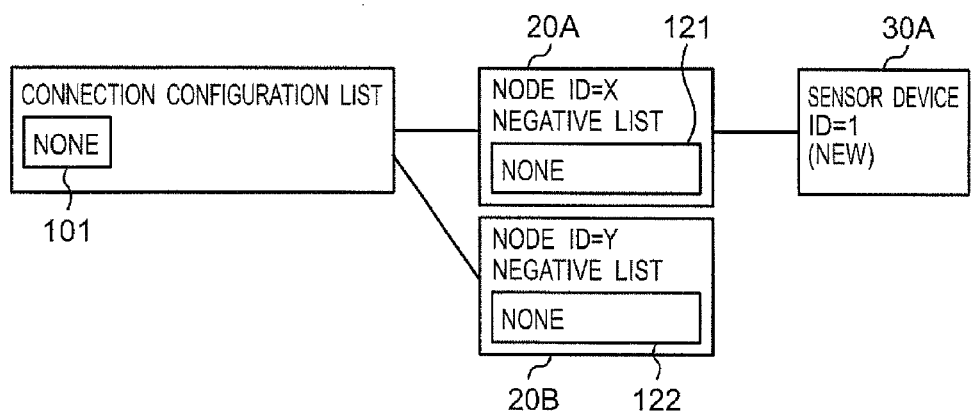
FIG. 15A is a diagram describing that a sensor device is newly installed in the second configuration example.

As illustrated in FIG. 15A, the node devices 20A and 20B store the synchronized connection configuration list 101 in the connection configuration list storage sections 64, respectively. The connection configuration list 101 describes "NONE" and is in the state (initial state) where which of the sensor devices and which of the node devices are in a corresponding relationship to be connected is unknown.

Further, correspondingly to the connection configuration list 101, both of the negative list 121 of the node device 20A and the negative list 122 of the node device 20B describe "NONE". As a result, the node devices 20A and 20B are ready to be connected with what kind of sensor devices.

In the case where a new sensor device 30A which is not on the connection configuration list 101 is installed, the sensor device 30A requests connections to the node devices 20A and 20B by specifying the common SSID stored in the common SSID storage section 73. The connection approval/disapproval determination section 52 of the node device 20A approves the connection with the sensor device 30A based on the negative list 121. Also, the connection approval/disapproval determination section 52 of the node device 20B approves the connection with the sensor device 30A based on the negative list 122. Then, the node device which made a response earlier (here, the node device 20A) responds to the connection request from the sensor device 30A, and the connection between the node device 20A and the sensor device 30A is established.

Then, the new sensor device detection section 56 of the node device 20A detects the sensor device 30A as a new sensor device.

Figure 15B:
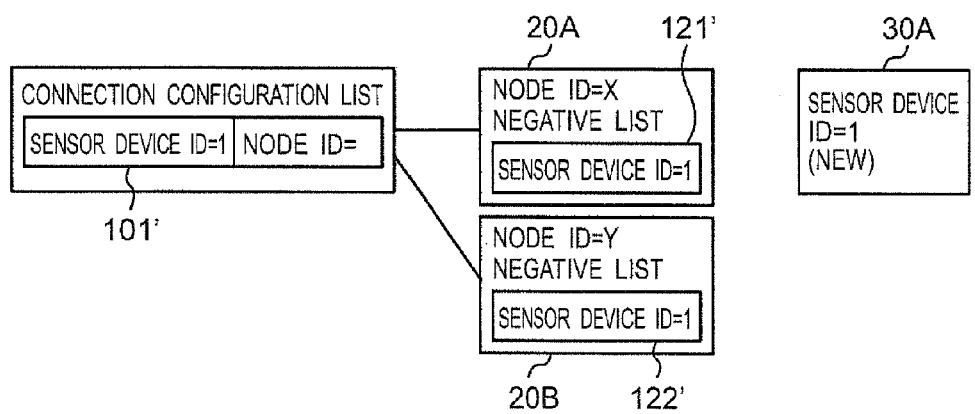
FIG. 15B is a diagram describing that the connection configuration list has been updated to correspond to the newly installed sensor device in the second configuration example.

Next, when the new sensor device detection section 56 detects the sensor device 30A, a connection configuration list 101' which describes sensor device ID=1 and NODE ID=(blank), i.e., which describes that the node device corresponding to the sensor device 30A is unknown is created as illustrated in FIG. 15B. An LCD display section (now shown) provides a visual display for prompting an input for determining which of the plurality of node devices 20 is to be connected with the sensor device 30A. Therefore, when the new sensor device is detected, the network system can prompt the user to perform the input.

Here, the negative list creating sections 55 and 55 of the node devices 20A and 20B create negative lists 121' and 122', respectively, based on the connection configuration list 101'. Both of the negative lists 121' and 122' describes "sensor device ID=1".

Then, the connection approval/disapproval determination section 52 of the node device 20A does not approve the connection with the sensor device 30A based on the negative list 121'. As a result, the connection between the node device 20A and the sensor device 30A is cut off.

Figure 15C:
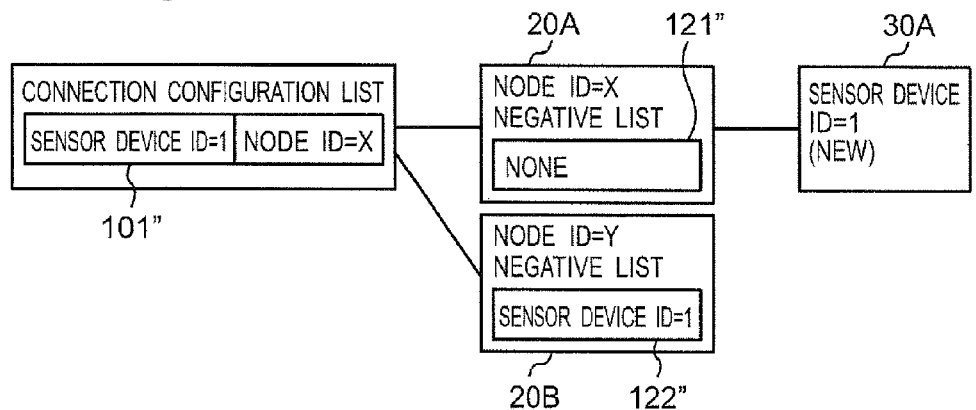
FIG. 15C is a diagram describing that connection between the newly installed sensor device and the node device has been established based on the updated connection list in the second configuration example.

Then, as illustrated in FIG. 15C, a system administrator, for example, creates a connection configuration list 101" by adding an item to the connection configuration list 101' through the input device (not shown), therefore, the connection configuration list 101" describes that sensor device ID=1 corresponds to NODE ID=X. On this occasion, the negative list creating sections 55 and 55 of the node devices 20A and 20B create negative lists 121" and 122", respectively, based on the connection configuration list 101". Here, the negative list 121" describes "NONE" and the negative list 122" describes "sensor device ID=1" as the negative list 122' does.

Then, the connection approval/disapproval determination section 52 of the node device 20A approves the connection with the sensor device 30A based on the negative list 121". As a result, the node device 20A responds to the connection request from the sensor device 30A, and the connection between the node device 20A and the sensor device 30A is established. On the other hand, the connection approval/disapproval determination section 52 of the node device 20B disapproves the connection with the sensor device 30B based on the negative list 122". As a result, the connection between the node device 20B and the sensor device 30A is not established.

As described above, even in the case where a connection request is issued by a new sensor device 30 which is not on the connection configuration list 101 to one of the node devices, any of the node devices 20 can respond to the request and connect with the new sensor device 30.

Now, a flow which starts with new installment of the sensor device 30B and ends with establishment of connection between the node device 20B and the sensor device 30B as a result of causing the new sensor device detection section 56 illustrated in FIG. 14 to function will be described in detail with reference to FIGS. 16A to 16C (The reference signs of FIGS. 14 and 6 will be used as required).

Figure 16A:
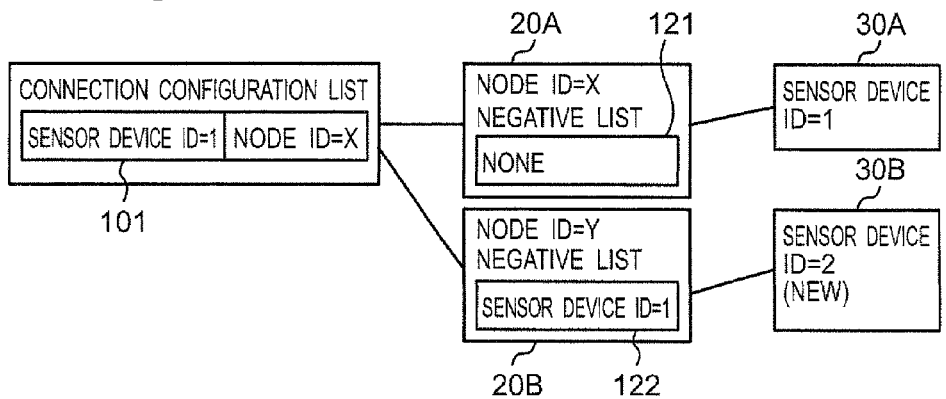
FIG. 16A is a diagram describing that a sensor device is newly installed in the second configuration example.

As illustrated in FIG. 16A, the node devices 20A and 20B store the synchronized connection configuration list 101 in the connection configuration list storage sections 64, respectively. The connection configuration list 101 describes that the sensor device ID=1 and NODE ID=X correspond to each other.

Further, since the negative list 121 of the node device 20A does not describe any sensor device to be disapproved of connection to the node device 20A correspondingly to the connection configuration list 101, the negative list 121 of the node device 20A describes "NONE". On the other hand, the negative list 122 of the node device 20B describes "sensor device ID=1", the ID of the sensor device 30A which is to be disapproved of connection to the node device 20B. As a result, the connection between the node device 20A and the sensor device 30A is established.

In the case where a new sensor device 30B which is not on the connection configuration list 101 is installed, the sensor device 30B requests connections to the node devices 20A and 20B by specifying the common SSID stored in the common SSID storage section 73. The connection approval/disapproval determination section 52 of the node device 20A is ready to approve the connection with the sensor device 30A based on the negative list 121 of itself, and the connection approval/disapproval determination section 52 of the node device 20B is also ready to approve the connection with the sensor device 30B based on the negative list 122 of itself, and in this example, the connection between the node device 20B and the sensor device 30B is established.

Then, the new sensor device detection section 56 of the node device 20B detects the sensor device 30B as a new sensor device.

Figure 16B:
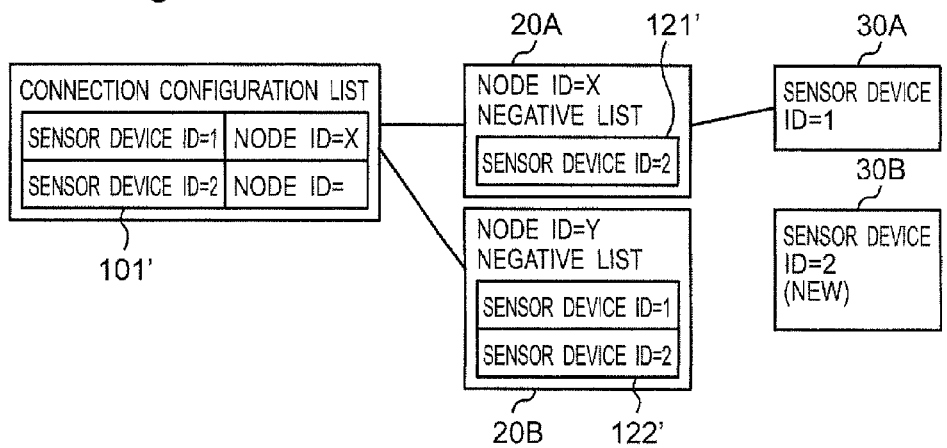
FIG. 16B is a diagram describing that the connection configuration list has been updated to correspond to the newly installed sensor device in the second configuration example.

Next, when the new sensor device detection section 56 detects the sensor device 30B, a connection configuration list 101' which describes sensor device ID=2 and NODE ID=(blank), i.e., which has an item indicating that the node device corresponding to the sensor device 30B is unknown added to the connection configuration list 101 is created as illustrated in FIG. 16B. An LCD display section (now shown) provides a visual display for prompting an input for determining which of the plurality of node devices 20 is to be connected with the sensor device 30B.

Here, the negative list creating sections 55 and 55 of the node devices 20A and 20B create negative lists 121' and 122', respectively, based on the connection configuration list 101'. The negative list 121' describes "sensor device ID=2" and the negative list 122' describes "sensor device ID=1, sensor device ID=2".

Then, the connection approval/disapproval determination section 52 of the node device 20B does not approve the connection with the sensor device 30B based on the negative list 121'. As a result, the connection between the node device 20B and the sensor device 30B is cut off.

Figure 16C:
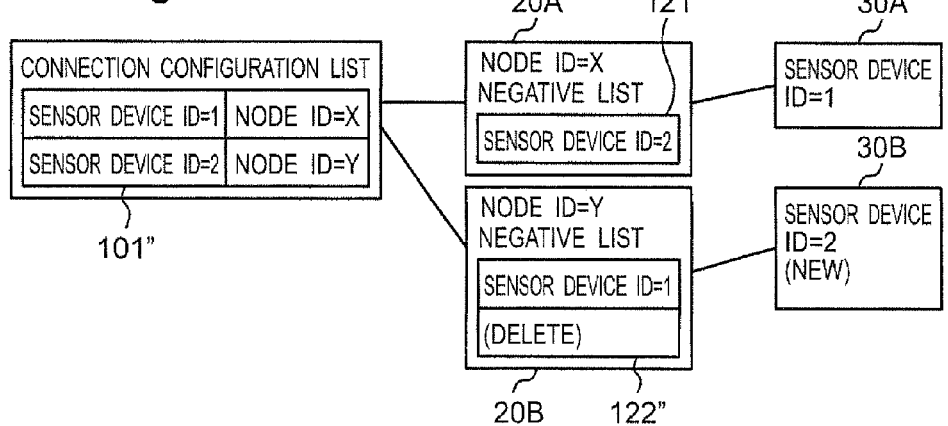
FIG. 16C is a diagram describing that connection between the newly installed sensor device and the node device has been established based on the updated connection list in the second configuration example.

Next, as illustrated in FIG. 16C, a system administrator, for example, adds an item to the connection configuration list 101' through the input device (not shown) to create a connection configuration list 101". As a result, the connection configuration list 101" describes that the sensor device ID=1 and NODE ID=X correspond to each other and that the sensor device ID=2 and NODE ID=Y correspond to each other. On this occasion, the negative list creating sections 55 and 55 of the node devices 20A and 20B create negative lists 121" and 122", respectively, based on the connection configuration list 101". The negative list 121" describes "sensor device ID=2" as the negative list 121' does, and the negative list 122" describes "sensor device ID=1".

Then, the connection approval/disapproval determination section 52 of the node device 20A approves the connection with the sensor device 30A based on the negative list 121". As a result, the node device 20A responds to the connection request from the sensor device 30A, and the connection between the node device 20A and the sensor device 30A is established. On the other hand, the connection approval/disapproval determination section 52 of the node device 20B approves the connection with the sensor device 30B based on the negative list 122". As a result, the connection between the node device 20B and the sensor device 30B is established.

As described above, even in the case where a connection request is issued by a new sensor device 30 which is not on the connection configuration list 101 to one of the node devices, any of the node devices 20 can respond to the request and connect with the new sensor device 30.

Now, a flow in which, in response to an occurrence of a failure of the node device 20B, the failure detection section 53 and the connection configuration list rewriting section 54 illustrated in FIG. 14 are caused to function so that the connection destination of the sensor device 30B is changed and connection between the node device 20A and the sensor device 30B is established will be described in detail with reference to FIGS. 17A to 17C (The reference signs of FIGS. 14 and 6 will be used as required).

Figure 17A:
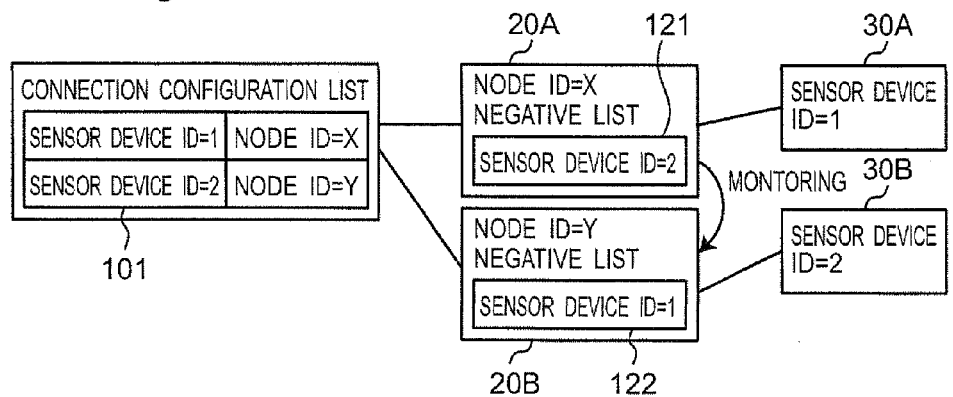
FIG. 17A is a diagram describing that the node device is monitoring another node device for failure in the second configuration example.

As illustrated in FIG. 17A, the node devices 20A and 20B store the synchronized connection configuration list 101 in the connection configuration list storage sections 64, respectively. The connection configuration list 101 describes that the sensor device ID=1 and NODE ID=X correspond to each other and that the sensor device ID=2 and NODE ID=Y correspond to each other.

Further, correspondingly to the connection configuration list 101, the negative list 121 of the node device 20A describes "sensor device ID=2". On the other hand, the negative list 122 of the node device 20B describes "sensor device ID=1". As a result, the connection between the node device 20A and the sensor device 30A is established while the connection between the node device 20B and the sensor device 30B is established.

The node device 20A is monitoring the node device 20B for failure by the failure detection section 53 which detects a failure of the node device 20B.

Figure 17B:
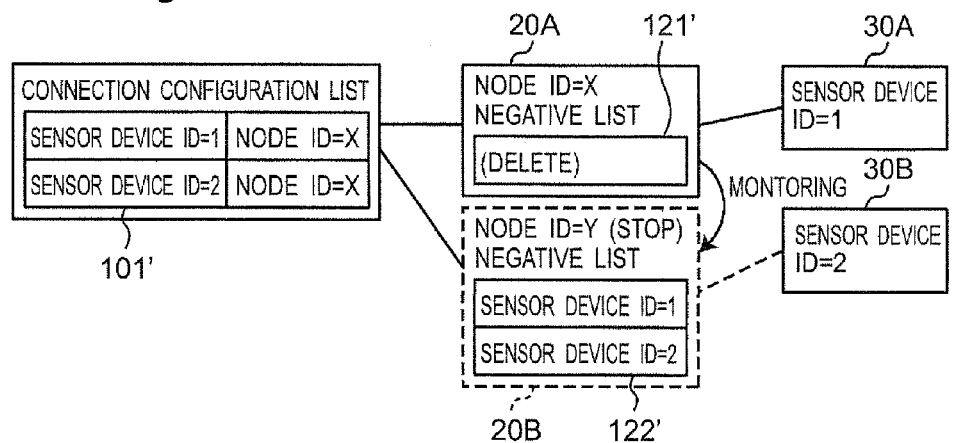
FIG. 17B is a diagram describing that a failure occurs in the other node device in the second configuration example.

Then, as illustrated in FIG. 17B, it is assumed that a failure occurs in the node device 20B and is detected by the failure detection section 53 of the node device 20A, and then, the connection configuration list rewriting section 54 of the node device 20A rewrites the connection configuration list 101 to a connection configuration list 101' so that the node device 20A and the sensor device 30B which has been approved of connection to the node device 20B are in the corresponding relationship to be connected. Specifically, the list describing that the sensor device ID=2 corresponds to NODE ID=Y is rewritten as the list describing that the sensor device ID=2 corresponds to NODE ID=X. On this occasion, the negative list creating sections 55 and 55 of the node devices 20A and 20B create negative lists 121' and 122', respectively, based on the connection configuration list 101'. Here, the negative list 121' describes "NONE". On the other hand, the negative list 122' describes "sensor device ID=1, sensor device ID=2".

Figure 17C:
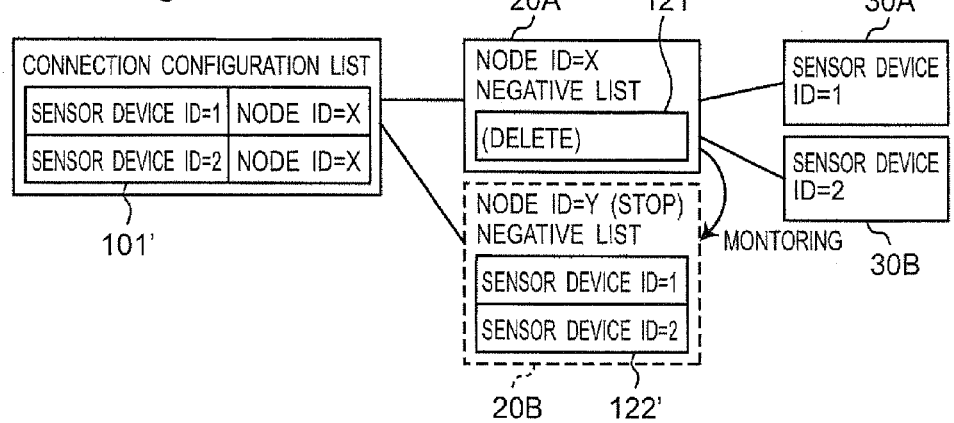
FIG. 17C is a diagram describing that connection between a sensor device which has been connected to the node device having a failure and the node device which has been monitoring for failure has been established in the second configuration example.

Then, as illustrated in FIG. 17C, the connection approval/disapproval determination section 52 of the node device 20A approves the connection with the sensor devices 30A and 30B based on the updated negative list 121'. As a result, the node device 20A responds to the connection requests from the sensor devices 30A and 30B, and the connections between the node device 20A and the sensor devices 30A and 30B are established.

As described above, even in the case where the failure is detected, the sensor device 30B which has been approved of connection to the node device 20B can be automatically switched from the node device 20B to the node device 20A by the connection configuration list rewriting section 54 and connected to the node device 20A. That is, in the case where a failure occurs in any of the plurality of node devices 20, the connection configuration list rewriting section 54 rewrites the connection configuration list 101, so that the node device 20 to which the sensor device 30 is to connect can be changed. As a result, fault-tolerance (being tolerant to failure, i.e., capability of minimizing damage caused by the failure) can be realized. In addition, the sensor device 30 does not need to perform any particular processing in changing the node device 20 to connect to. Therefore, the configuration of the sensor device 30 can be simplified.

Here, instead of the connection configuration list rewriting section 54, the user may rewrite the connection configuration list 101 via the network 2 by an input through the input device 16 of the client PC 10. In that way, the user is allowed to change the node device 20, to which the sensor device 30 is to connect, with desired timing such as when a failure occurs in any of the node devices 20 or when the user wants to distribute a load to a specific node device 20.

Now, a flow in which the connection destination of the sensor device 30B is changed from the node device 20B to the node device 20A by an input operation by the user and connection between the sensor device 30B and the node device 20A is established will be described in detail with reference to FIGS. 18A to 18C (The reference signs of FIGS. 12 and 6 will be used as required).

Figure 18A:
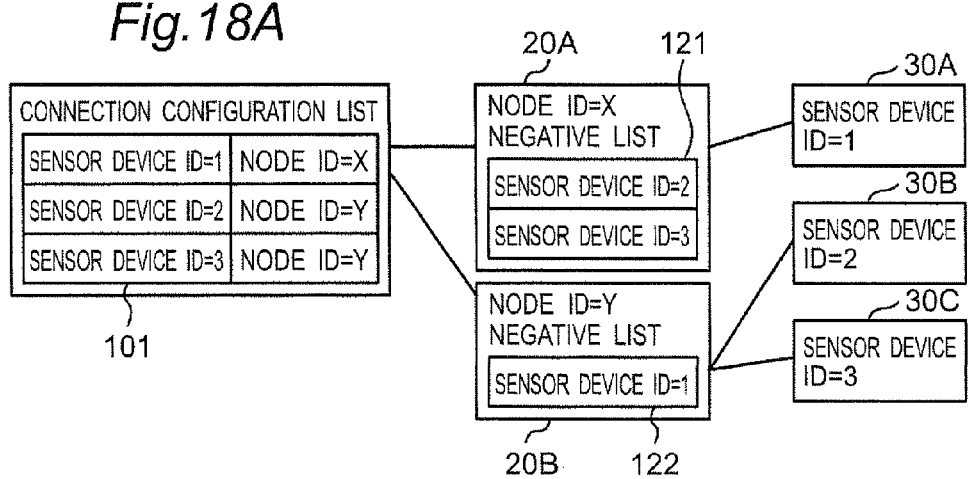
FIG. 18A is a diagram describing a state before the connection state between the node device and the sensor device is changed in the second configuration example.

As illustrated in FIG. 18A, the node devices 20A and 20B store the synchronized connection configuration list 101 in the connection configuration list storage sections 64, respectively. The connection configuration list 101 describes that the sensor device ID=1 and NODE ID=X correspond to each other and that the sensor device ID=2 and NODE ID=Y correspond to each other, and further, that the sensor device ID=3 and NODE ID=Y correspond to each other.

Further, correspondingly to the connection configuration list 101, the negative list 121 of the node device 20A describes "sensor device ID=2, sensor device ID=3" and the negative list 122 of the node device 20B describes "sensor device ID=1". As a result, the connection between the node device 20A and the sensor device 30A is established while connections between the node device 20B and the sensor devices 30B and 30C are established.

Figure 18B:
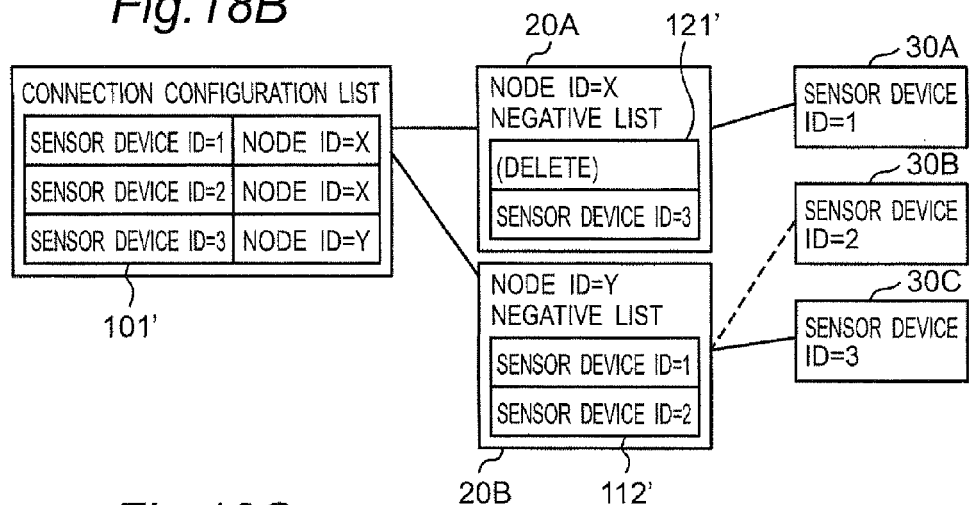
FIG. 18B is a diagram describing a process of changing the connection state between the node device and the sensor device in the second configuration example.

Then, as illustrated in FIG. 18B, the user, for example, rewrites the connection configuration list 101 to a connection configuration list 101' through the input device (not shown). As a result, the connection configuration list 101' describes that the sensor device ID=1 and NODE ID=X correspond to each other and that the sensor device ID=2 and NODE ID=X correspond to each other, and further, that the sensor device ID=3 and NODE ID=Y correspond to each other. On this occasion, the negative list creating sections 55 and 55 of the node devices 20A and 20B create negative lists 121' and 122', respectively, based on the connection configuration list 101'. Here, the negative list 121' describes "sensor device ID=3". On the other hand, the negative list 122' describes "sensor device ID=1, sensor device ID=2".

Figure 18C:
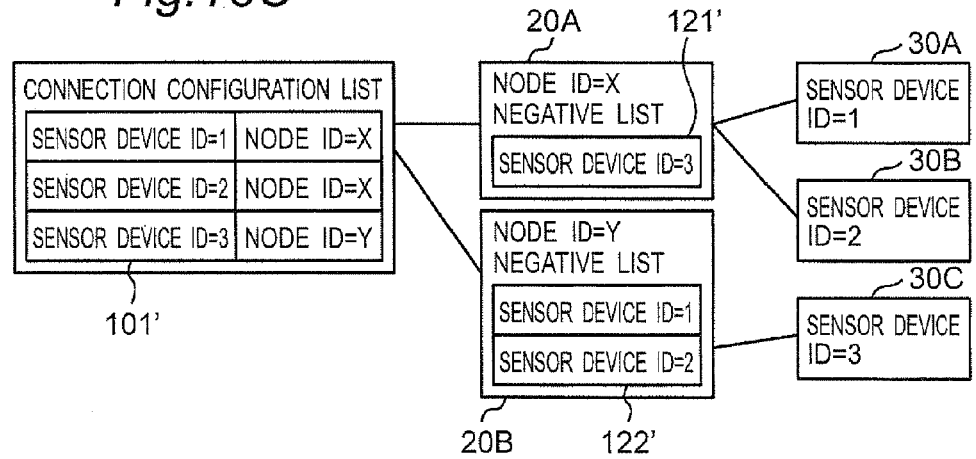
FIG. 18C is a diagram describing a state after the connection state between the node device and the sensor device has been changed in the second configuration example.

Then, as illustrated in FIG. 18C, the connection approval/disapproval determination section 52 of the node device 20A approves the connections with the sensor devices 30A and 30B based on the negative list 121'. As a result, the node device 20A responds to the connection requests from the sensor devices 30A and 30B, and the connections between the node device 20A and the sensor devices 30A and 30B are established. On the other hand, the connection approval/disapproval determination section 52 of the node device 20B approves the connection with the sensor device 30C based on the negative list 122'. As a result, the node device 20B responds to the connection request from the sensor device 30C, and the connection between the node device 20B and the sensor device 30C is established.

Therefore, the user can voluntarily change the combinations of each of the node devices 20 and the sensor devices 30 which are connected to the node device 20.

Further, the sensor device 30A only needs to specify the common SSID stored in the common SSID storage section 63 to connect to the node device 20A without needing to search for any of the node devices 20 to which the sensor device 30A can connect via wireless communication. Therefore, the sensor device 30A can connect to the node device 20A in a short time by a simple process. As a result, the power consumption required by the sensor device 30A in the process of connecting to the node device 20A can be reduced. For example, in the case where the sensor device 30A is powered by a battery, the life of the battery of the sensor device 30A can be extended. Further, the sensor device 30A can request connection to the plurality of node devices 20 without determining the node device 20 to connect to. Therefore, the sensor device 30A can be voluntarily installed and easily managed.

Although the network system 1 includes a client PC 10 as a computer device in the above described embodiments, the network system 1 is not limited to that. The network system 1 may include a plurality of client devices, or various types of computers which can communicate via network such as a server device and a host computer.

Although it is assumed that a client PC 10 as a computer device and the node devices 20A, 20B, 20C, . . . are connected by the LAN 2 as a network in the above described embodiments, the network is not limited to that. The network connecting the computer device and the node device may be a computer network such as a wide area network (WAN) or the Internet whether they are wired or wireless.

Although the network identifier is an SSID for identifying the wireless LAN in the above described embodiments, the network identifier is not limited to that. Any identifier may be used for the network identifier as far as it can identify the LAN from LANs of the other network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE SIGNS

1: Network system
2: LAN
10: Client PC
14: LCD display section
16: Input device
20, 20A, 20B, 20C: Node device
30, 30A, 30B, 30C, 30D, 30E, 30F, 30G: Sensor device
101: Connection configuration list

The invention claimed is:

1. A network system, comprising:
a computer device; and
a plurality of node devices communicatively connected to the computer device via network with one or more sensor devices allowed to be connected to each of the plurality of node devices via wireless communication,
wherein each of the node devices obtains sensor data from the sensor device which is connected to the node device itself via the wireless communication and saves the sensor data in a sensor data storage section incorporated in the node device itself,
wherein the computer device specifies and requests via the network sensor data that any one or more of the one or more sensor devices obtained, and obtains via the network the specified sensor data from the node device which has saved the specified sensor data in the sensor data storage section among the plurality of node devices,
wherein each of the node devices has a previously defined common network identifier for the wireless communication,
wherein each of the sensor devices requests connection to the plurality of node devices by specifying the network identifier to perform the wireless communication,
wherein the network system further comprises a connection configuration list storage section which stores a connection configuration list,
wherein the connection configuration list shows a corresponding relationship between each of the node devices and each of the sensor devices to be connected,
wherein each of the node devices has a connection approval/disapproval determination section which determines approval or disapproval of connection to each of the sensor devices based on the connection configuration list in response to the connection request from each of the sensor devices, and
wherein each of the node devices has:
a failure detection section which detects a failure of the node devices other than the node device itself; and
a connection configuration list rewriting section which rewrites the connection configuration list upon the failure detection section detecting the failure so that the node device itself and the sensor devices which have been approved of connection to the other node devices are in the corresponding relationship to be connected.

2. The network system according to claim 1, wherein the connection configuration list storage section is provided for each of the plurality of node devices and contents of the connection configuration list storage sections are synchronized with each other.

3. The network system according to claim 1, wherein the network identifier is a service set identifier for identifying a wireless LAN.

4. A node device group comprising a plurality of node devices in a network system, wherein, in the network system,
at least a computer device and the plurality of node devices are communicatively connected to each other via network with one or more sensor devices allowed to be connected to each of the plurality of node devices via wireless communication,
each of the node devices obtains sensor data from the sensor device which is connected to the node device itself via the wireless communication and saves the sensor data in a sensor data storage section incorporated in the node device itself,
the computer device specifies and requests via the network sensor data that any one or more of the one or more sensor devices obtained, and obtains via the network the specified sensor data from the node device which has saved the specified sensor data in the sensor data storage section among the plurality of node devices,
each of the node devices has a previously defined common network identifier for the wireless communication,
each of the sensor devices requests connection to the plurality of node devices by specifying the network identifier to perform the wireless communication,
the network system further comprising a connection configuration list storage section which stores a connection configuration list, the connection configuration list showing a corresponding relationship between each of the node devices and each of the sensor devices to be connected,
each of the node devices has a connection approval/disapproval determination section which determines approval or disapproval of connection to each of the sensor devices based on the connection configuration list in response to the connection request from each of the sensor devices, and each of the node devices has:

a failure detection section which detects a failure of the node devices other than the node device itself; and a connection configuration list rewriting section which rewrites the connection configuration list upon the failure detection section detecting the failure so that the node device itself and the sensor devices which have been approved of connection to the other node devices are in the corresponding relationship to be connected.

\* \* \* \* \*